(12) United States Patent
Collins

(10) Patent No.: US 9,849,476 B1
(45) Date of Patent: Dec. 26, 2017

(54) RISER ASSEMBLIES WITH UTILITY CONDUITS AND METHODS FOR OPERATING A RISER ASSEMBLY

(71) Applicant: Wade E. Collins, The Dalles, OR (US)

(72) Inventor: Wade E. Collins, The Dalles, OR (US)

(*) Notice: Subject to any disclaimer, the term of this patent is extended or adjusted under 35 U.S.C. 154(b) by 410 days.

(21) Appl. No.: 14/145,836

(22) Filed: Dec. 31, 2013

Related U.S. Application Data

(63) Continuation-in-part of application No. 12/903,186, filed on Oct. 12, 2010, now Pat. No. 8,746,590, which is a continuation-in-part of application No. 11/983,273, filed on Nov. 8, 2007, now Pat. No. 7,832,659.

(51) Int. Cl.
| | | |
|---|---|---|
| *B05B 1/30* | (2006.01) | |
| *B05B 12/02* | (2006.01) | |
| *B05B 15/06* | (2006.01) | |
| *A01G 25/16* | (2006.01) | |
| *B05B 12/00* | (2006.01) | |

(52) U.S. Cl.
CPC ............. *B05B 12/02* (2013.01); *A01G 25/16* (2013.01); *B05B 1/30* (2013.01); *B05B 12/00* (2013.01); *B05B 15/06* (2013.01)

(58) Field of Classification Search
CPC ........... B05B 1/30; B05B 12/02; B05B 15/06; B05B 15/10; A01G 25/16
See application file for complete search history.

(56) References Cited

U.S. PATENT DOCUMENTS

| | | | |
|---|---|---|---|
| 3,439,895 A | | 4/1969 | Marandi |
| 4,014,359 A | * | 3/1977 | Sanner .................... A01G 25/16 137/356 |
| 4,193,543 A | | 3/1980 | Viesturs et al. |
| 4,669,663 A | | 6/1987 | Meyer |
| 4,883,228 A | | 11/1989 | Vydrzal et al. |
| 5,011,081 A | | 4/1991 | Bentley |
| 5,133,501 A | | 7/1992 | Marshall |
| 6,050,500 A | | 4/2000 | Ensworth |
| 6,135,362 A | * | 10/2000 | Purdy ...................... B05B 12/00 239/200 |
| 6,234,411 B1 | | 5/2001 | Walker et al. |
| 6,491,235 B1 | * | 12/2002 | Scott ......................... B05B 1/30 239/206 |
| 6,568,608 B2 | | 5/2003 | Sirkin |

(Continued)

*Primary Examiner* — Ryan Reis
(74) *Attorney, Agent, or Firm* — TraskBritt

(57) ABSTRACT

Described are riser assemblies suitable for use with fluid dispensers. The assemblies include a container partially circumscribing a reservoir configured to contain a pressurized fluid, the container having a fluid inlet and a fluid outlet disposed therethrough. The assemblies may further include a signal processor situateable outside the container that is configured to receive a signal. The signal processor may be operatively connectable to a control valve that is operatively connectable to the fluid dispenser. The control valve may be configured to selectively control expulsion of the fluid through the fluid dispenser in response to the signal received by the signal processor. Embodiments of the riser assemblies include a utility conduit disposed at least partially within the reservoir and configured to enable secondary use of a resource from within the riser assembly and/or to accommodate transport and securing of the riser assemblies for use.

20 Claims, 28 Drawing Sheets

(56) References Cited

U.S. PATENT DOCUMENTS

| | | | |
|---|---|---|---|
| 6,808,127 B2 * | 10/2004 | McNulty | B05B 15/10 239/205 |
| 6,874,696 B1 | 4/2005 | Ericksen et al. | |
| 7,121,478 B1 | 10/2006 | Jones | |
| 7,832,659 B1 | 11/2010 | Collins | |

* cited by examiner

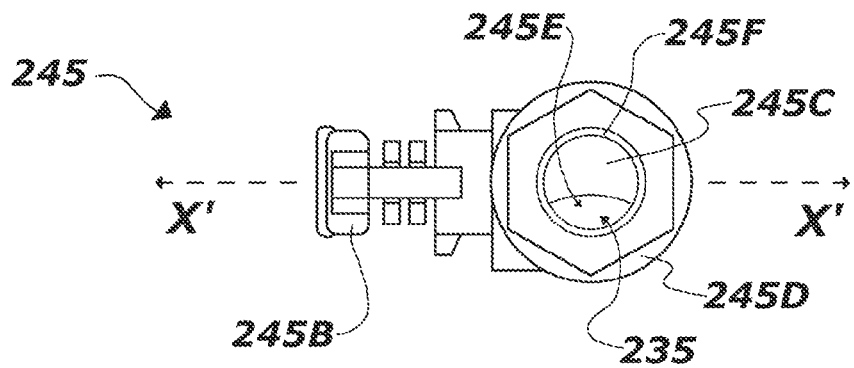
FIG. 12
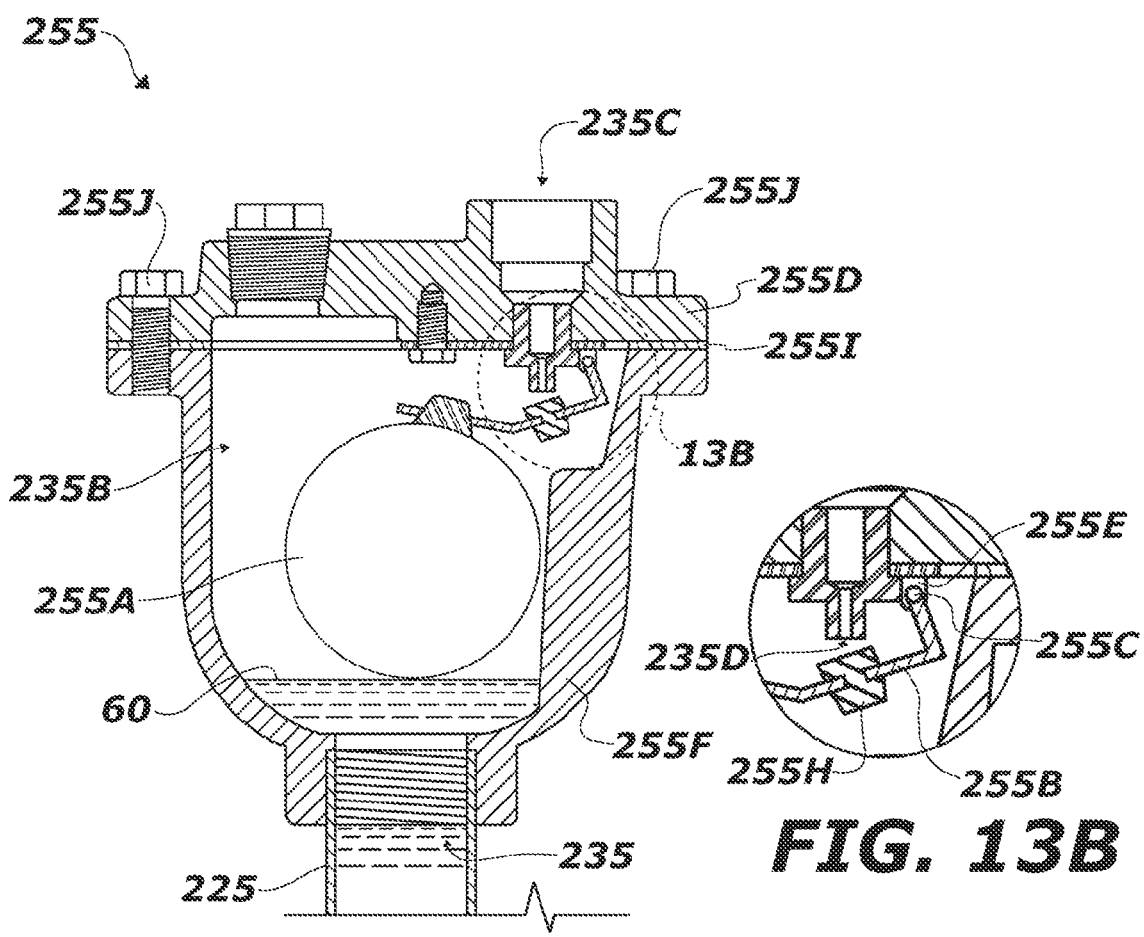
FIG. 13A
FIG. 13B

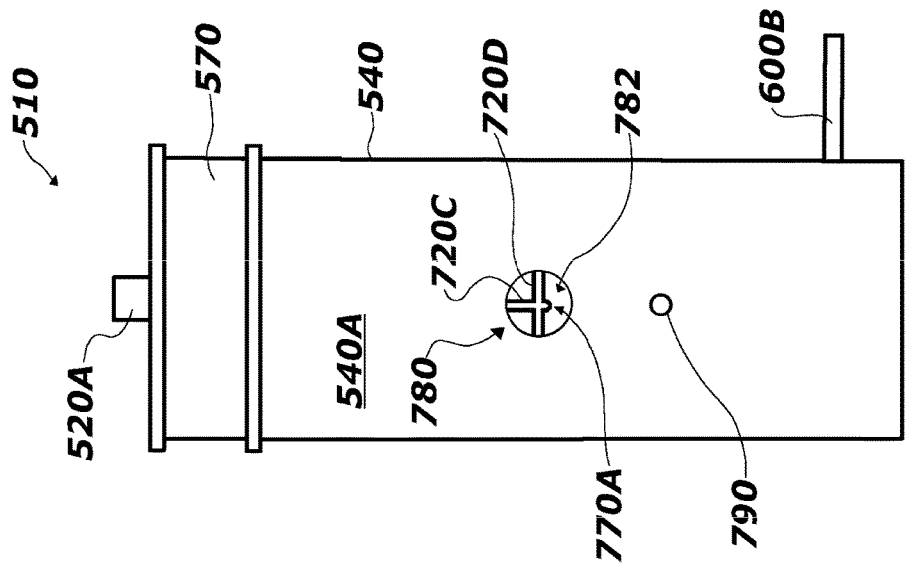
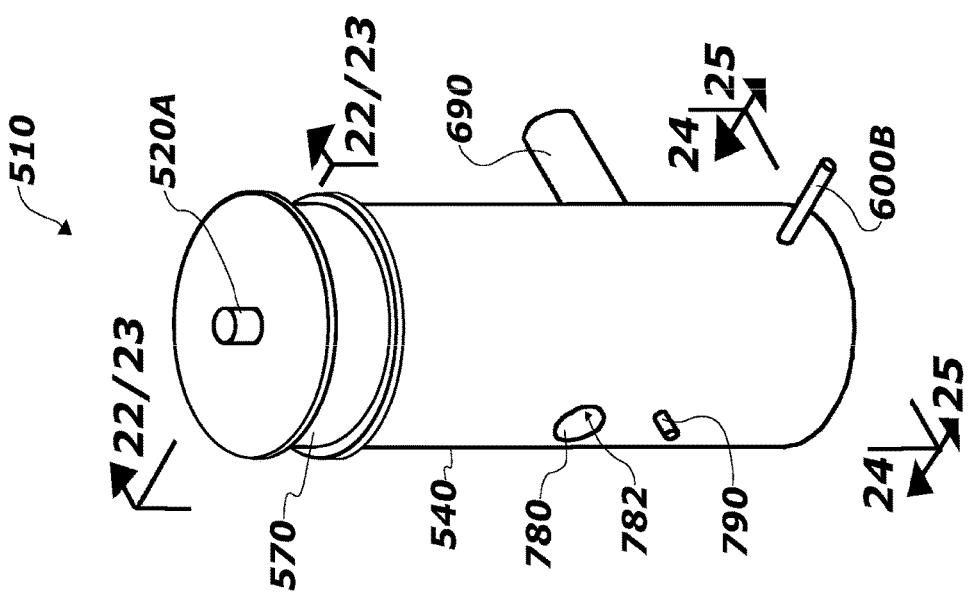
FIG. 18
FIG. 17

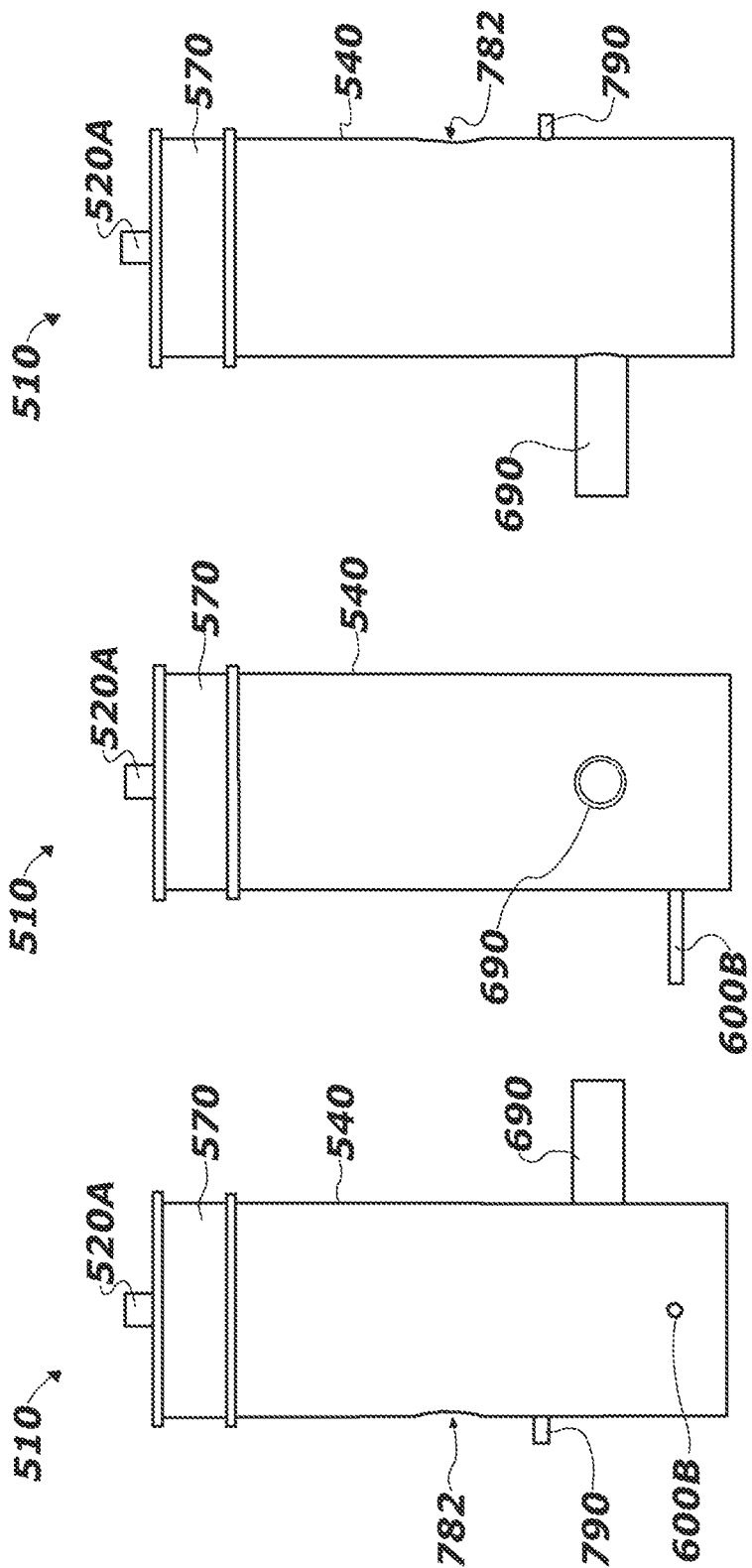

RISER ASSEMBLIES WITH UTILITY CONDUITS AND METHODS FOR OPERATING A RISER ASSEMBLY

CROSS-REFERENCE TO RELATED APPLICATIONS

This application is a continuation-in-part of U.S. patent application Ser. No. 12/903,186, filed Oct. 12, 2010, now U.S. Pat. No. 8,746,590, issued Jun. 10, 2014, which is a continuation-in-part of U.S. patent application Ser. No. 11/983,273, filed Nov. 8, 2007, now U.S. Pat. No. 7,832,659, issued Nov. 16, 2010, the disclosures of each of which is hereby incorporated herein by this reference in its entirety.

TECHNICAL FIELD

The riser assembly generally relates to a riser assembly for use with a fluid dispenser and related methods. More specifically, the assembly relates to a riser assembly for use with a fluid-dispensing sprinkler, which may be operably controlled via a signal carrier passing through a fluid-filled portion of the riser assembly.

BACKGROUND

The agricultural and other industries often make use of processes for conveying fluid from a pressurized fluid source through a fluid-dispensing sprinkler. In a conventional process, fluid pressurized by a pump is conveyed from a supply pipe through a riser assembly and expelled through a sprinkler. Various means for controlling expulsion of fluid through a sprinkler have been utilized. Fluid expulsion may be controlled using a control valve associated with the sprinkler, a control valve associated with the riser assembly, or a control valve associated with an intermediate connector between the riser assembly and the sprinkler. A wire or other signal carrier may convey a signal to a signal processor that may then process the signal and influence movement of the control valve to control fluid expelled.

The installation, maintenance, removal, and transport of a conventional riser assembly may present a number of challenges. Particularly with riser assemblies used with high-output directional sprinklers, a first set of challenges may arise from the significant and potentially-destabilizing forces that may be exerted upon the riser assembly during expulsion of fluid through the sprinkler. This challenge may be compounded where such forces may be exerted from varying angular or lateral directions as, for example, in the case of a riser assembly used with a powerful rotary sprinkler.

Another set of challenges may arise from temperature variations, precipitation, and other environmental conditions encountered in the often-rugged outdoor settings where a riser assembly may be used. These environmental conditions may pose a challenge not only to the riser assembly itself but, additionally, to functional elements operatively connectable with the riser assembly and, for example, to wires and other signal carriers, signal processors, and control valves.

Past approaches to address the foregoing challenges have been proposed. One such approach involves the burial of all or most of the riser assembly in soil or other ground material. In addition to burial of the riser assembly in the ground, approaches for stabilizing a riser assembly include encasement of the riser assembly within a concrete pier or attachment of the riser assembly to materials that either are not removable or are not easily removable without damaging the riser assembly. Such attempts to stabilize riser assemblies have typically resulted in assemblies that are (1) complicated, difficult, expensive, and time consuming to install and maintain, and (2) complicated, difficult, expensive, or even impossible to remove, transport, and reinstall. For example, installation of such conventional risers often requires digging, drilling, cutting, grinding, beveling, welding, screwing, gluing, tarring, and pouring concrete. This often requires the use of numerous man hours and varying types of tools and pieces of equipment. Where conventional risers are secured using poured concrete, in particular, the concrete often needs to be allowed to solidify before the riser can be utilized, and breaking apart the concrete to try to remove the conventional riser can lead to damage to the riser itself.

Conventional risers may include one or more inlets and one or more outlets through which water or another fluid may be passed into and out of, respectively, the riser. However, once passed into the riser, the riser may not be configured to allow water to be selectively dispensed for practical use through other than the sprinkler dispenser (also referred to herein as a "sprinkler head") or a drain outlet. Therefore, the riser may occupy a water source for a sole purpose, i.e., for dispensing through the sprinkler dispenser, and the water source may not be otherwise utilized without removing the riser assembly or without significant modification to the riser assembly.

Likewise, for riser assemblies to which power is supplied, a conventional riser assembly may not be configured to allow the power to be utilized outside of the riser system, even when the riser assembly is not utilizing its full power source.

SUMMARY

Disclosed is a riser assembly that comprises a container including a reservoir configured to hold a pressurized fluid. A signal conduit traverses through the reservoir. The signal conduit defines therein a channel. The signal conduit isolates the channel from the reservoir. A utility conduit communicates through at least one area of the container and is located at least partially within the reservoir. The utility conduit may be configured to, for example, enable access to resources (e.g., fluid or power) within the reservoir for a secondary use. Accordingly, such riser assemblies provide increased versatility compared to conventional riser assemblies. Also, the utility conduit may be configured to accommodate transportation of the riser assembly, or accommodate securing of the riser assembly for use. Therefore such riser assemblies may be more easily transported and installed, and re-transported and re-installed, compared to conventional riser assemblies.

Also disclosed is a riser assembly comprising a container wall at least partially circumscribing a reservoir. A utility conduit at least partially traverses a width of the reservoir. A power-utilizing device is disposed at least partially within the utility conduit and is isolated from the reservoir. An electrical conduit traverses at least a portion of the reservoir and communicates between the utility conduit and a region exterior to the container. The utility conduit may be configured to, for example, enable a secondary use of power. As such, the riser assembly may not wholly monopolize a power resource.

Also disclosed is a method for operating a riser assembly. The method comprises at least partially filling a reservoir within a container of the riser assembly with the fluid. The method also comprises selectively opening a valve disposed within a utility conduit that extends through an area of the container and at least partially into the reservoir. The valve is recessed relative to an exterior surface of the container. Accordingly, the method enables dispensation of fluid from the riser assembly through a valve disposed within a periphery of the container. Such valve may, therefore, be more than valves of, e.g., conventional riser assemblies, disposed on an exterior of the assembly.

BRIEF DESCRIPTION OF THE DRAWINGS

FIG. 12 is a bottom plan schematic illustration of a second ball valve subassembly of, e.g., FIG. 9.

FIG. 13A is a cross-sectional, left side, elevational schematic illustration taken along line 13-13 of FIG. 9.

FIG. 13B is an enlarged illustration of segment 13B of FIG. 13A.

FIG. 17 is a top, rear, and right side, perspective schematic illustration of a riser assembly according to another embodiment of the present disclosure, wherein the riser assembly includes a utility conduit configured to accommodate secondary usage of the fluid within the reservoir.

FIG. 18 is a rear side, elevational schematic illustration of the riser assembly of FIG. 17.

FIG. 19 is a right side, elevational schematic illustration of the riser assembly of FIGS. 17 and 18.

FIG. 20 is a front side, elevational schematic illustration of the riser assembly of FIGS. 17 through 19.

FIG. 21 is a left side, elevational schematic illustration of the riser assembly of FIGS. 17 through 20.

DETAILED DESCRIPTION

Figure 1:
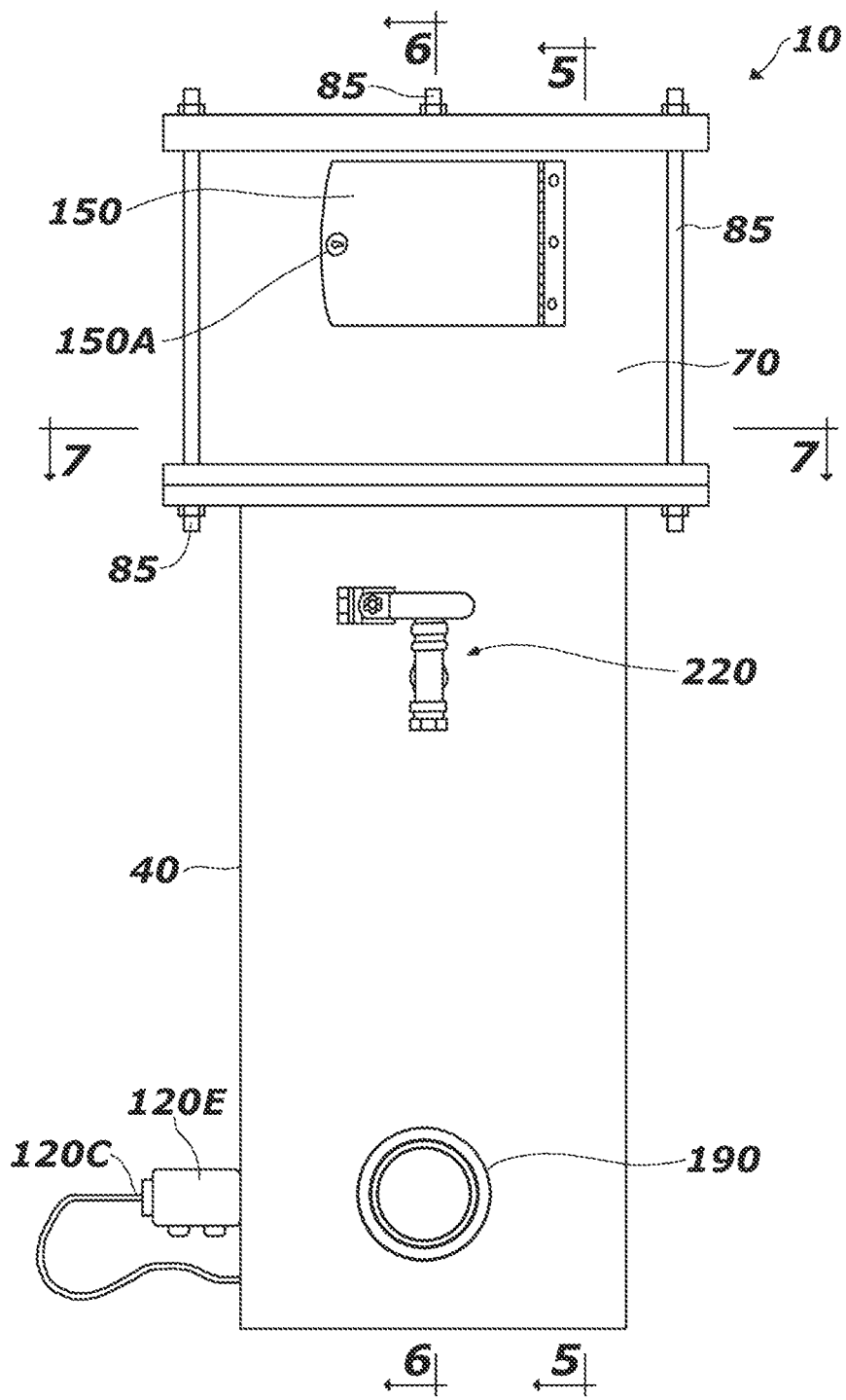
FIG. 1 is a front side, elevational schematic illustration of a riser assembly according to an embodiment of the present disclosure.

Riser assemblies and methods for operating riser assemblies are disclosed. Embodiments of the riser assemblies and methods may be usable with even high-output, directional sprinklers. Embodiments of the riser assembly may facilitate rapid, efficient, yet sturdy and easily-modifiable connection of the riser assembly to a pressurized fluid source. Installation of embodiments of the riser assembly may not require a concrete pier or even burial of a majority of the riser assembly in the ground. Further, embodiments of the adjustably-weighted riser assembly may be easily and efficiently installed, maintained, removed, and reinstalled with minimal use of tools and without damage to the riser assembly and any associated signal carrier, signal processor, or means for controlling expulsion of fluid through the sprinkler. Additionally, embodiments of the disclosed riser assemblies with utility conduits enable secondary use of resources within the riser assembly, such as fluid and power, and accommodate the transportation and installation of the riser assembly.

The riser assembly provides a reservoir configured to contain a pressurized fluid, which reservoir is at least partially circumscribed by a container. A signal processor is included and is situateable outside of the container. The signal processor is operatively connectable to means for selectively controlling expulsion of fluid through the sprinkler, such as a control valve, in response to a signal received by the signal processor.

In some embodiments, the riser assembly includes a conduit circumscribing a channel occupiable by a signal carrier, the conduit having a fluid-excluding intermediate portion passing through the reservoir. When the reservoir contains pressurized fluid, e.g., after the reservoir has been filled, the conduit also passes through the pressurized fluid. In such conduit-including embodiments, the riser assembly may thus allow for disposal of a signal carrier through a fluid-excluding and insulated channel to carry a signal from outside the container through the channel to the signal processor. The channel may be accordingly insulated from elements outside the container not only by the conduit and container but also by the pressurized fluid within the reservoir.

In some embodiments, the riser assembly includes a utility conduit communicating through at least one area of the container. The utility conduit, disposed at least partially within the reservoir, enables access to a resource within the riser assembly (e.g., fluid within the reservoir or power fed to valves or other electronic components within the riser assembly), accommodates transportation of the riser assembly (e.g., prior to installation, after removal, or between installations), accommodates securing of the riser assembly for use, or any combination thereof. Accordingly, the utility conduit defines another volume of the riser assembly from which the pressurized fluid may be excluded, and the utility conduit may enable secondary uses of resources that may otherwise be monopolized by a conventional riser assembly.

Because the riser assembly includes a reservoir configured to contain pressurized fluid, it may be rendered heavier and more stable, compared to a conventional riser assembly, during times of use when the reservoir is filled with fluid and may be rendered lighter, compared to a conventional riser assembly, during the assembly's installation, removal, and transport when the reservoir is devoid of fluid. Adjustments to the amount of pressurized fluid contained within the reservoir may therefore adjust the weight of the riser assembly itself.

Among other uses, the assembly may have particular utility in the livestock feeding context wherein many animals may be enclosed in close proximity for feeding prior to their sale at market. Feedlot irrigation systems often include a main water supply line connected to a system of subterranean supply lines and a plurality of risers, each riser being connectable to the water supply line. A sprinkler head operatively connects to the riser to dispense water over a desired area. This feedlot irrigation leads to minimization of airborne dust, which could otherwise produce nose, respiratory, skin, and eye problems. Feed lot irrigation may also facilitate bacterial and disease control and may assist in reducing the mortality rate and damage to livestock prior to sale. Feed lot irrigation may moderate ground temperature and thereby may reduce stress upon livestock.

The present riser assembly may be configured for use with a fluid dispenser, particularly a sprinkler. In at least one embodiment, the riser assembly includes a container and a cover. The container partially circumscribes a reservoir configured to contain pressurized fluid, the container having a fluid inlet and a fluid outlet disposed therethrough. The cover is connectable to the container, the cover having an aperture configured to contain or receive a sprinkler supply line disposed therethrough. A cavity is formed between the cover and the container. In some embodiments, the assembly further includes a conduit circumscribing a channel occupiable by a signal carrier, the conduit having a fluid-excluding intermediate portion disposed within the reservoir, a first conduit portion disposed through the container to a signal carrier entry area outside the container, and a second conduit portion disposed through the container to a signal carrier exit area. In these or other embodiments, the assembly may further include a utility conduit defining therein a volume. The utility conduit may be disposed at least partially within the reservoir, and fluid within the reservoir may be excluded from the volume defined by the utility conduit. The utility conduit may provide select access to resources such as fluid or power and may accommodate transportation or installation of the riser assembly.

The riser assembly may facilitate rapid, efficient, sturdy, and easily-modifiable connection of the riser assembly to a pressurized fluid source and the stable use thereof without need of a concrete pier, permanent anchor, or the burial of a majority of the riser assembly in the ground. Therefore the number of tools and pieces of equipment required for installation may be minimized as may be installation time and removal time, should removal be desired.

The present riser assembly may be selectively, adjustably weighted so as to be (1) heavier and more stable during operation and the expulsion of fluid from the assembly through an operatively connected fluid dispenser and (2) lighter during installation, removal, and transport of the riser assembly.

In some embodiments of the assembly, an insulated channel is provided that contains a signal carrier that is insulated not only by a conduit contained within a container but also by a reservoir fillable with pressurized fluid.

The present riser assembly may be configured to be used with a fluid dispenser that is a high-output, directional sprinkler. It may also be configured to be easily and efficiently installed, maintained, removed, and reinstalled, with minimal use of additional tools and without damage to the riser assembly or any associated signal carrier, associated signal processor, or associated means for controlling expulsion of fluid through the sprinkler. The minimal number of component parts of the assembly further may provide for stable, easy, and simple installation, use, and removal. The riser assembly may also be of a simple construction, compared to a conventional riser assembly, and may be economically feasible, durable, and relatively free of trouble in use and operation. According to one embodiment, the assembly largely comprises high density polyethylene ("HDPE") such that parts within the riser assembly and connections made to the riser assembly may be fused to one another so as to minimize the risk of leaks. The HDPE composition may further minimize the risk of cracking due to extreme environmental conditions, may reduce the likelihood of electric shock to an installer or other person or animal that should come in contact with the riser, and may allow for relatively-easy attachment or reattachment of other HDPE fittings by fusing the same to the riser assembly.

Still other features and advantages of the claimed assemblies and methods will become readily apparent to those skilled in the art from the following detailed description describing example embodiments of the assemblies and methods. The drawings and description of embodiments are to be regarded as illustrative, and not restrictive.

As used herein, the term "secondary usage" means and includes a usage other than one enabling dispensation of fluid from the riser assembly through a fluid dispenser (e.g., sprinkler) supported over the cover of the riser assembly. Such secondary usages may be of resources such as fluid or energy.

As used herein, the terms "e.g.," "etc.," and "or" indicate non-exclusive alternatives without limitation unless otherwise noted.

As used herein, spatially relative terms, such as "below," "lower," "under," "bottom," "above," "higher," "over," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the elements in addition to the orientation depicted in the figures. For example, if elements in the figures are inverted, elements described as "below" or "lower than" or "under" or "on bottom of" other elements or features would then be oriented "above" or "higher than" or "over" or "on top of" the other elements or features. Thus, the term "below" can encompass both an orientation of above and below, depending on the context in which the term is used, which will be evident to one of ordinary skill in the art. The elements may be otherwise oriented (rotated 90 degrees, inverted, flipped, etc.) and the spatially relative descriptors used herein interpreted accordingly.

As used herein, reference to an element as being "on" or "over" another element means and includes the element being directly on top of, adjacent to, underneath, or in direct contact with the other element. It also includes the element being indirectly on top of, adjacent to, underneath, or near the other element, with other elements present therebetween.

As used herein, the terms "comprises," "comprising," "includes," and/or "including" specify the presence of stated regions, areas, portions, elements, materials, components, and/or groups, but do not preclude the presence or addition of one or more other regions, areas, portions, elements, materials, components, and/or groups thereof.

As used herein, "and/or" includes any and all combinations of one or more of the associated listed items.

As used herein, the singular forms "a," "an," and "the" are intended to include the plural forms as well, unless the context clearly indicates otherwise.

Embodiments are described herein with reference to the illustrations. The illustrations presented herein are not meant to be actual views of any particular material, element, component, structure, or assembly, but are merely idealized representations that are employed to describe embodiments of the present disclosure. Variations from the shapes of the illustrations as a result, for example, of manufacturing techniques, are to be expected. Thus, embodiments described herein are not to be construed as being limited to the particular shapes and dispositions illustrated, but include deviations in shapes and dispositions that result, for example, from manufacturing or tailoring for a particular use. Therefore, the illustrated dispositions do not limit the scope of the present claims.

In the following description and in the figures, like elements are identified with like reference numerals.

Figure 2:
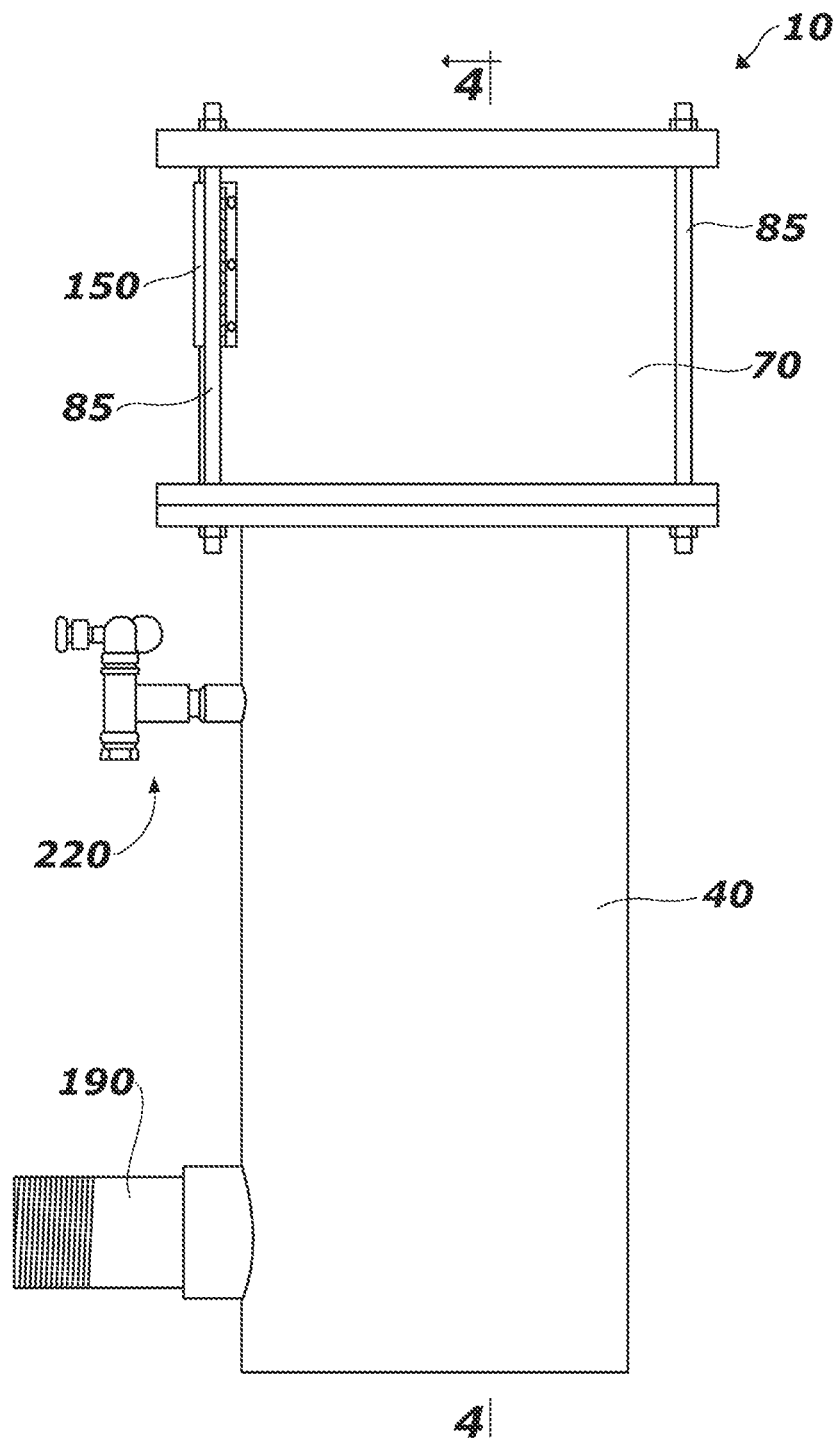
FIG. 2 is a left side, elevational schematic illustration of the riser assembly of FIG. 1.
Figure 3:
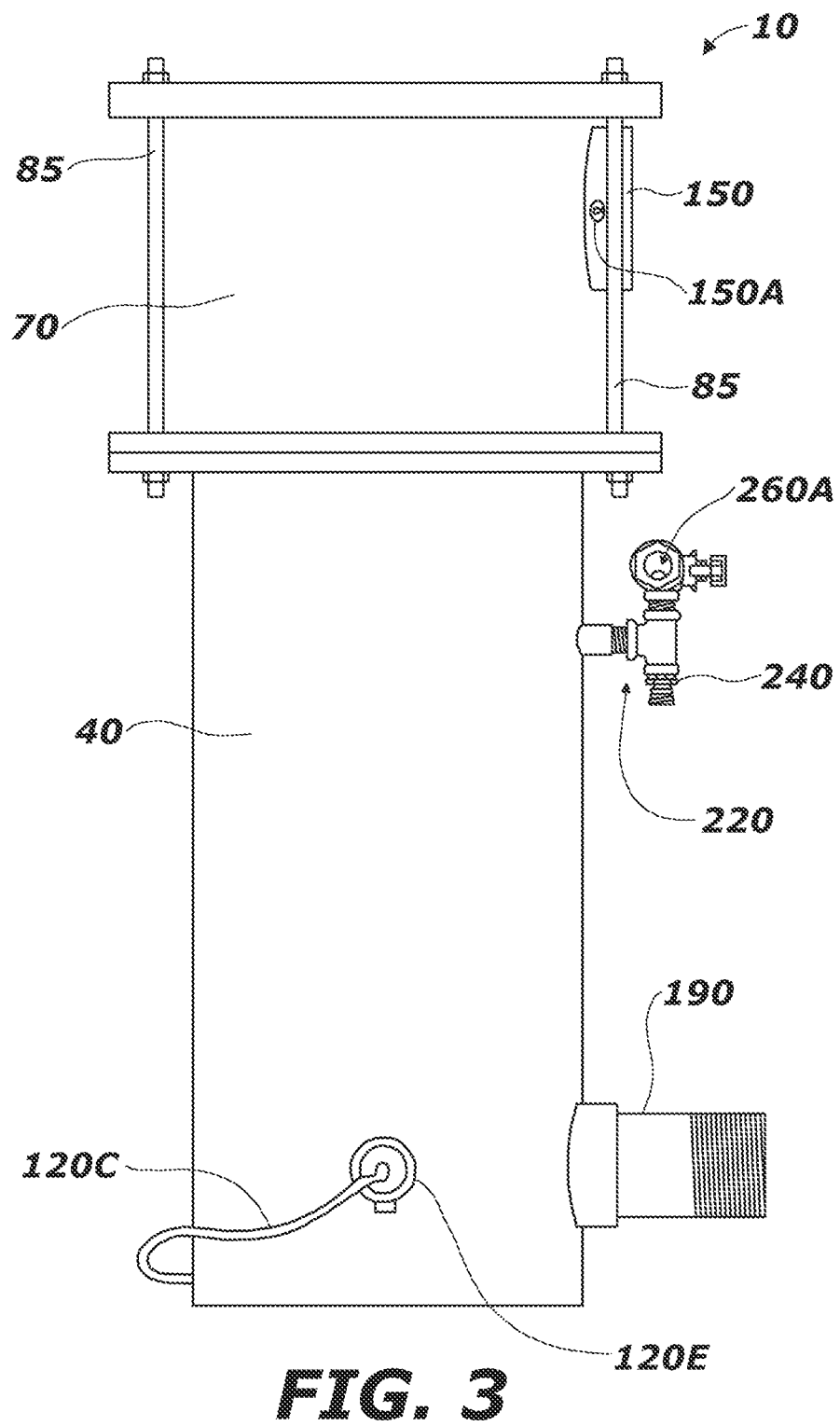
FIG. 3 is a right side, elevational schematic illustration of the riser assembly of FIGS. 1 and 2.

FIGS. 1 through 3 illustrate an embodiment of a riser assembly 10. The riser assembly 10 is configured for use with a fluid dispenser. The fluid dispenser may be a sprinkler illustrated generally as item 20 in FIG. 8 and, particularly, may be a sprinkler for spraying pressurized fluids with an associated control valve 30 (FIG. 9) configured to selectively control fluid expulsion through the sprinkler 20.

Figure 6:
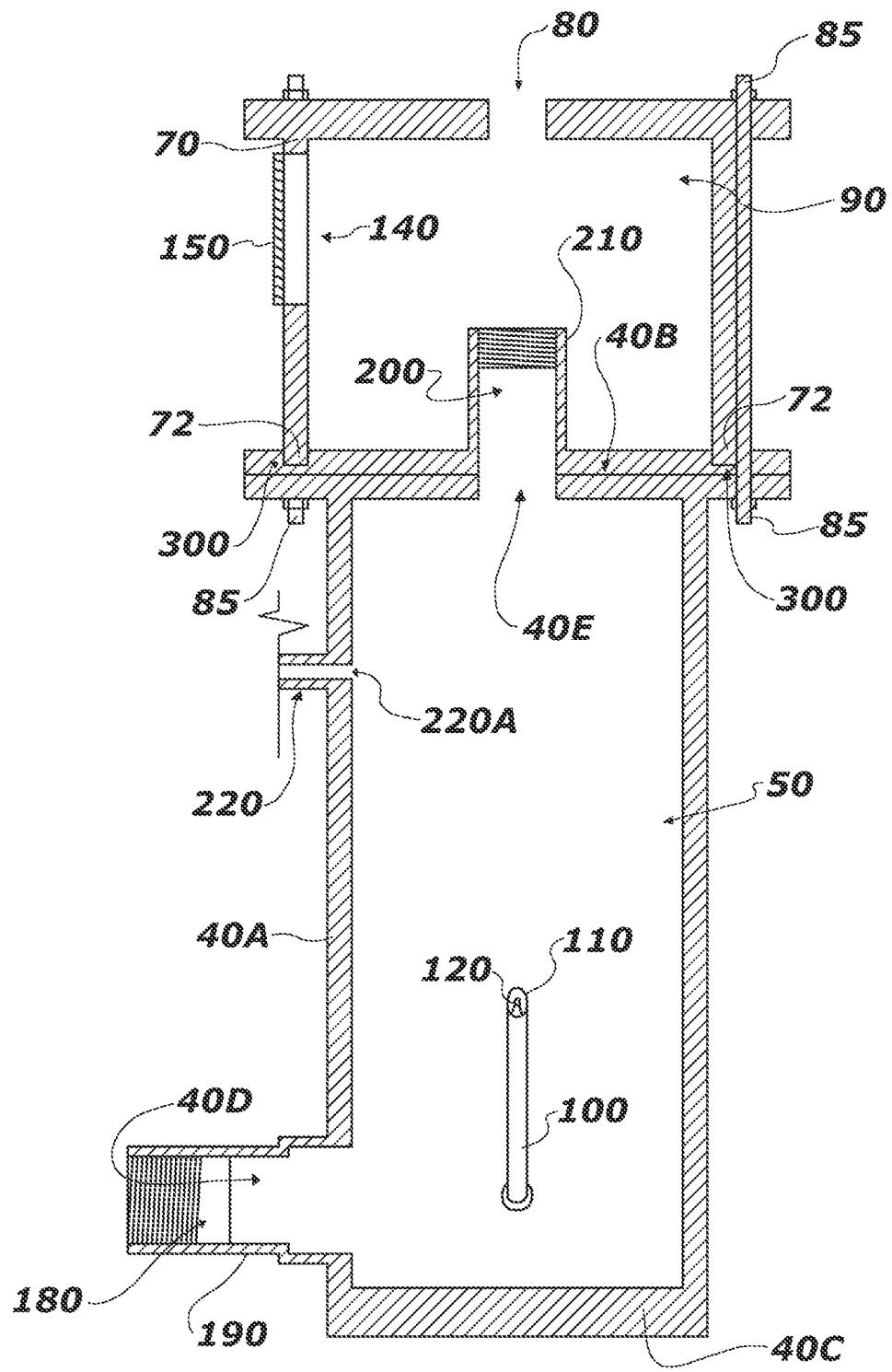
FIG. 6 is a cross-sectional, left side, elevational schematic illustration taken along line 6-6 of FIG. 1.
Figure 7:
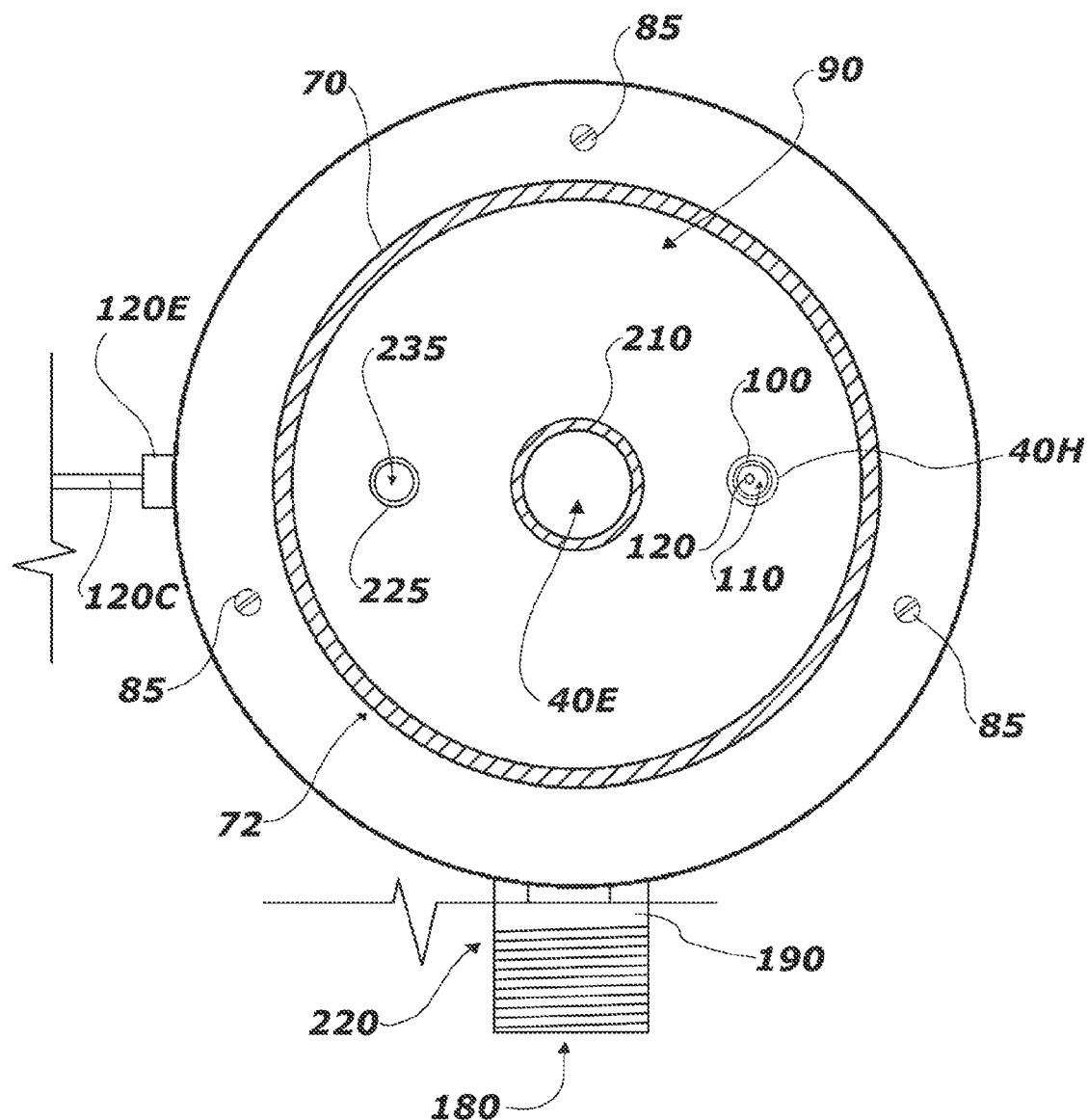
FIG. 7 is a cross-sectional, top plan schematic illustration taken along line 7-7 of FIG. 1.

With attention directed principally to FIGS. 1 through 7, the illustrated embodiment of the riser assembly 10 includes a container 40 having a sidewall 40A, a top 40B, and a bottom 40C. The container 40 partially circumscribes a reservoir 50 (FIGS. 4 through 6 and 9) for containing a pressurized fluid 60 (FIG. 9). The container 40 has a fluid inlet 40D (FIG. 6) and a fluid outlet 40E (FIG. 6) each disposed through the container 40. The riser assembly 10 also includes a cover 70 connectable, e.g., by a plurality of fasteners 85, to the top 40B of the container 40. The cover 70 has an aperture 80 (FIG. 6) for containing a sprinkler supply line 20A (FIGS. 8 and 9) disposed through the cover 70. A cavity 90 (FIGS. 4 through 6 and 9) may be formed between the cover 70 and the container 40. According to the illustrated embodiment, the riser assembly 10 further includes a conduit 100 (FIGS. 4 through 6 and 9) circumscribing a channel 110 (FIGS. 6 and 7) occupiable by a signal carrier 120 (FIGS. 6 and 7). The signal carrier 120 may be a plurality of wires or a cable for conveying an electronic signal. An intermediate conduit portion 100A of the conduit 100 is disposed within the reservoir 50 and is constructed to exclude fluid 60 within the reservoir 50 from the channel 110.

Figure 4:
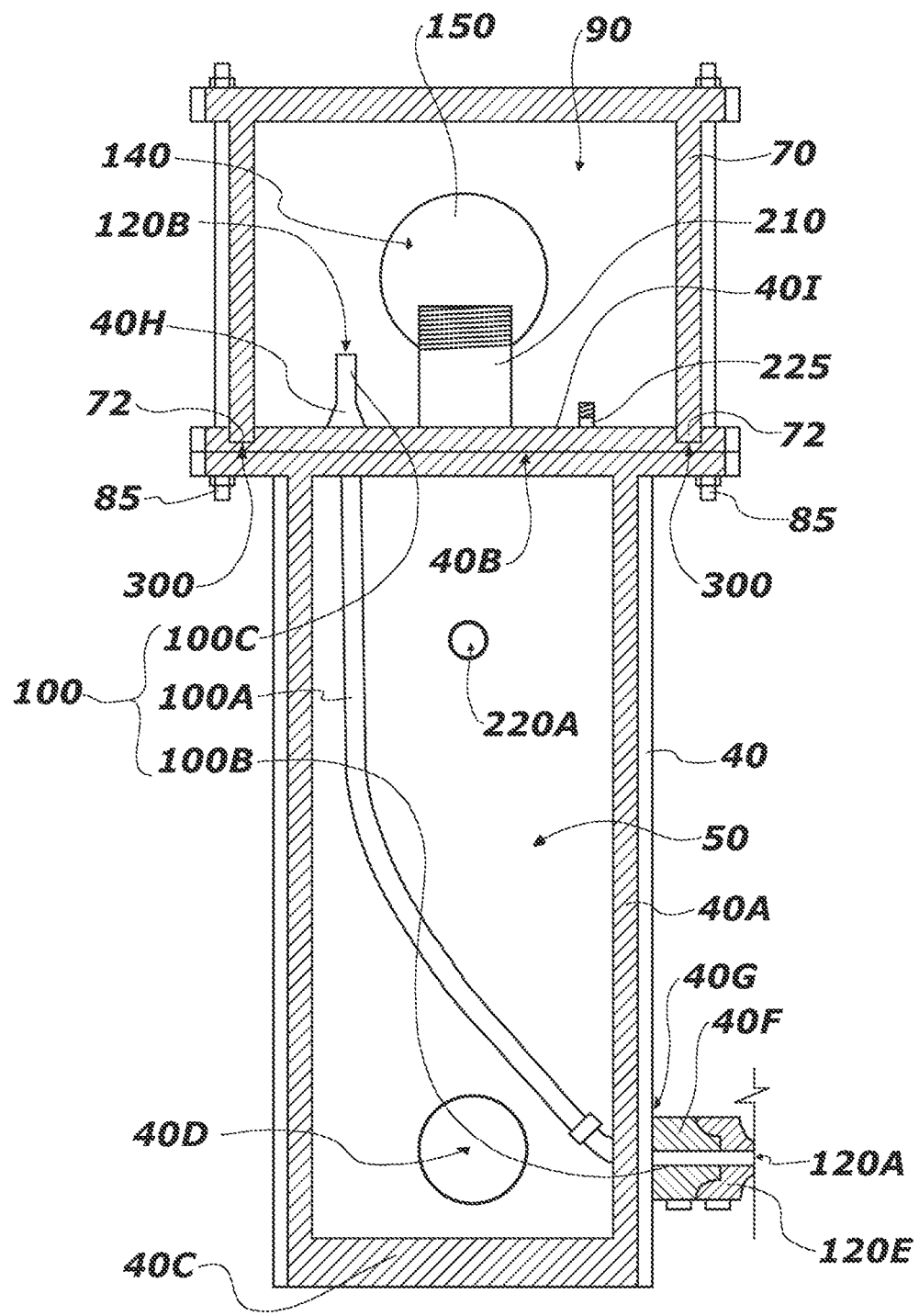
FIG. 4 is a cross-sectional, rear side, elevational schematic illustration taken along line 4-4 of FIG. 2.
Figure 5:
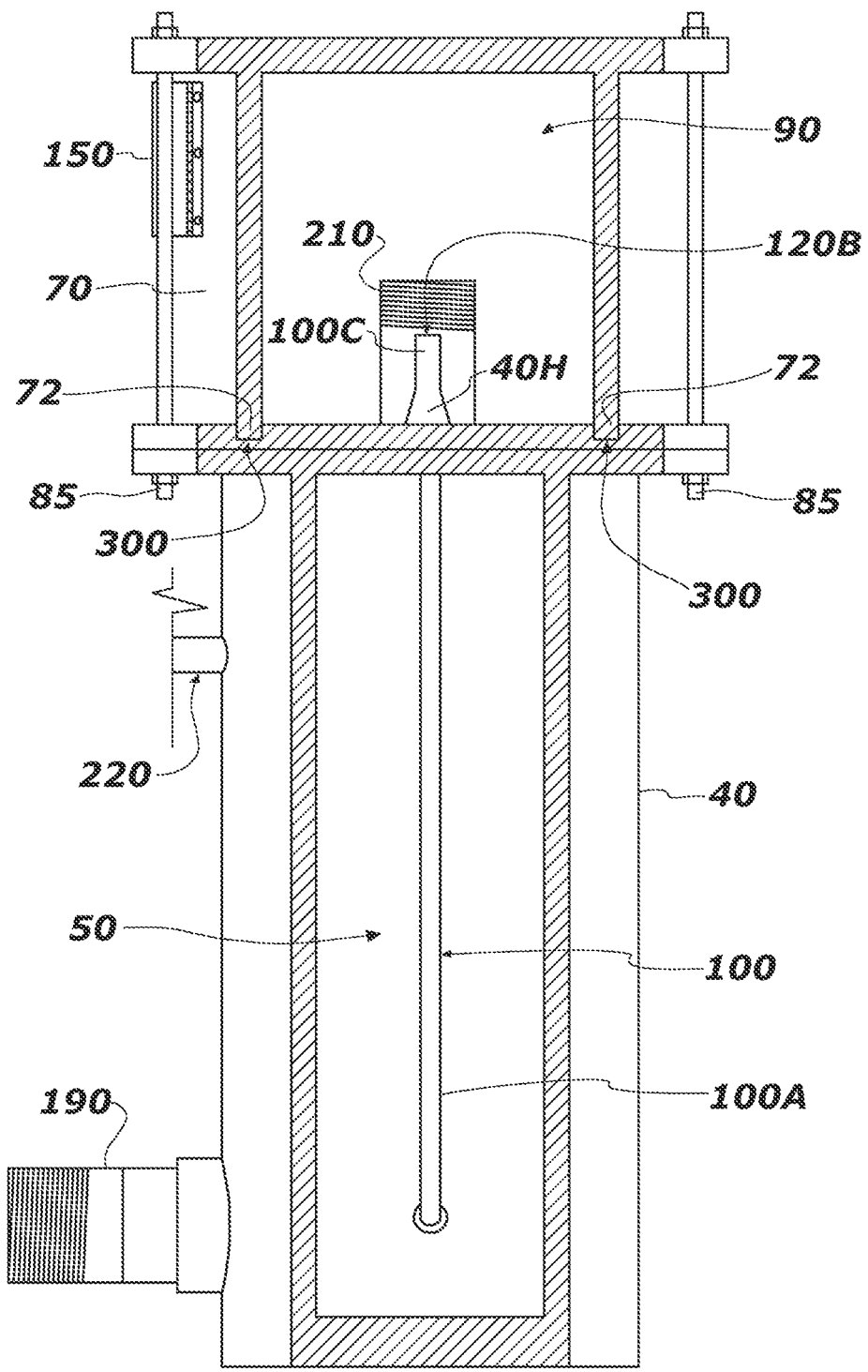
FIG. 5 is a cross-sectional, left side, elevational schematic illustration taken along line 5-5 of FIG. 1.

With attention directed primarily to FIG. 4, it is further seen that, in one embodiment of the riser assembly 10, a first conduit portion 100B operatively connects to the intermediate conduit portion 100A and is disposed through the container 40 to a signal carrier entry area 120A outside the container 40. A second conduit portion 100C operatively connects to the intermediate conduit portion 100A and is disposed through the container 40 to a signal carrier exit area 120B outside the container 40. The signal carrier exit area 120B may be within the cavity 90. The signal carrier 120 (FIGS. 6 and 7) may accordingly be disposed through the channel 110 (FIGS. 6 and 7), circumscribed by the conduit 100, to carry a signal from outside the container 40, e.g., from the signal carrier entry area 120A, through the channel 110 to a signal processor 130 (FIG. 9) situateable within the cavity 90, e.g., in the vicinity of the signal carrier exit area 120B. With reference to FIG. 9, the signal processor 130 may be operatively connectable to a control valve 30 configured to selectively control expulsion of fluid 60 through the sprinkler 20 in response to a signal received through the signal carrier 120 (FIGS. 6 and 7). In some configurations, the control valve 30 is operatively connectable to a solenoid 30A and a pressure regulator 30B. Also in some configurations, a second signal carrier coupler 120F is detachably connected to the remainder of the signal carrier 120, e.g., the portion of the signal carrier 120 proximal to the signal carrier exit area 120B, and is adapted for connection to the signal processor 130.

According to another embodiment (not shown) of the riser assembly 10, a signal may be wirelessly carried to the signal processor 130 situateable outside of the container 40. In such embodiment, no first conduit portion 100B, intermediate conduit portion 100A, or second conduit portion 100C may pass through the reservoir 50.

An embodiment of the riser assembly 10 may include and be adapted for use with and operative connection to a control valve 30, an example of which is identified as a "pilot operated valve" as disclosed in U.S. Pat. No. 3,439,895, the patent and items disclosed therein being incorporated herein by this reference. Such embodiment of the riser assembly 10 may be also adapted for use with and operative connection to a sprinkler, examples of which are identified as the "sprinkler head" disclosed in U.S. Pat. No. 4,669,663 and U.S. Pat. No. 4,193,543, the patents and items disclosed therein being incorporated herein by this reference. It is to be appreciated, though, that embodiments of the riser assembly 10 may be configured for use with alternate sprinklers, control valves, and/or signal processors that function to selectively control expulsion of pressurized fluid 60 from the reservoir 50 of the present assembly 10 through an operatively-attachable sprinkler 20 in response to a signal received by the signal processor 130. It is further to be appreciated that the assembly 10 may be configured to allow for operative connection to a fluid pressure regulator 30B, allowing a human operator to monitor fluid pressure.

In one embodiment, the container 40 and the conduit 100 comprise (e.g., are formed of) electrically-resistant, high density polyethylene (HDPE) capable of withstanding at least 200 pounds of pressure per square inch (at least 200 psi (at least about 1379 kPa)). Connections between the top 40B, the sidewall 40A, and the bottom 40C of the container 40 and the conduit 100 may be formed by joining (e.g., fusing or other bonding) the various structures, which may each be formed from HDPE, to one another. For example, the various structures may be subjected to an electro-fusion treatment. Such treatment may create a fluid-tight seal for containing a fluid 60 pressurized at up to 200 pounds per square inch (up to 200 psi (up to about 1379 kPa)). Alternatively, the container 40 may be formed by injection molding to provide an integral piece of high density polyethylene (HDPE) capable of withstanding at least 200 pounds of fluid pressure per square inch (at least 200 psi (at least about 1379 kPa)).

With further attention directed principally to FIGS. 1 through 7, in one embodiment of the riser assembly 10, the cover 70 may connect, by a plurality of fasteners 85, to the top 40B of the container 40. The cover 70 may have an aperture 80 (FIG. 6) configured to receive (e.g., contain) a sprinkler supply line 20A (FIG. 9) disposed therethrough. The cover 70 may facilitate formation of a protective cavity 90 between the cover 70 and the top 40B of the container 40. An opening 140 (FIG. 4) may be disposed through the cover 70, and the opening 140 may be coverable by a door 150, which may include a lock 150A (FIG. 3) selectively openable by a human operator to facilitate such operator's selective access to the cavity 90 and components contained therein. In one embodiment, the lock 150A selectively secures the door 150 to the cover 70.

With attention directed primarily to FIG. 4, in the illustrated embodiment the first conduit portion 100B may operatively connect to the intermediate conduit portion 100A and may be disposed through the container 40 to the signal carrier entry area 120A outside the container 40. The second conduit portion 100C may be operatively connected to the intermediate conduit portion 100A and may be disposed through the container 40 to the signal carrier exit area 120B outside the container 40. The signal carrier exit area 120B may be disposed within the cavity 90. The signal carrier 120 may, accordingly, be disposed through the channel 110 (FIGS. 6 and 7) circumscribed by the conduit 100 to carry a signal (e.g., an electronic signal (not shown)) from outside the container 40 through the channel 110 to the signal processor 130 (FIG. 9), which may be protected within the cavity 90. With reference to FIG. 9, the signal processor 130 may be operatively connected to means for selectively controlling expulsion of fluid 60 through the sprinkler 20 in response to a signal received through the signal carrier 120 (FIGS. 6 and 7). For example, according to the depicted embodiment, the signal processor 130 may be operatively connected to a control valve 30 configured to selectively control expulsion of fluid 60 through a sprinkler 20 in response to a signal received through the signal carrier 120 (FIGS. 6 and 7).

With reference to FIG. 4, the first conduit portion 100B may be disposed through a first extrusion 40F (FIG. 4). The first extrusion 40F may extend outwardly away from an outer surface 40G of the container 40. The second conduit portion 100C may be disposed through a second extrusion 40H (FIG. 4). The second extrusion 40H may extend upwardly away from an upper surface 40I of the container 40.

Figure 9:
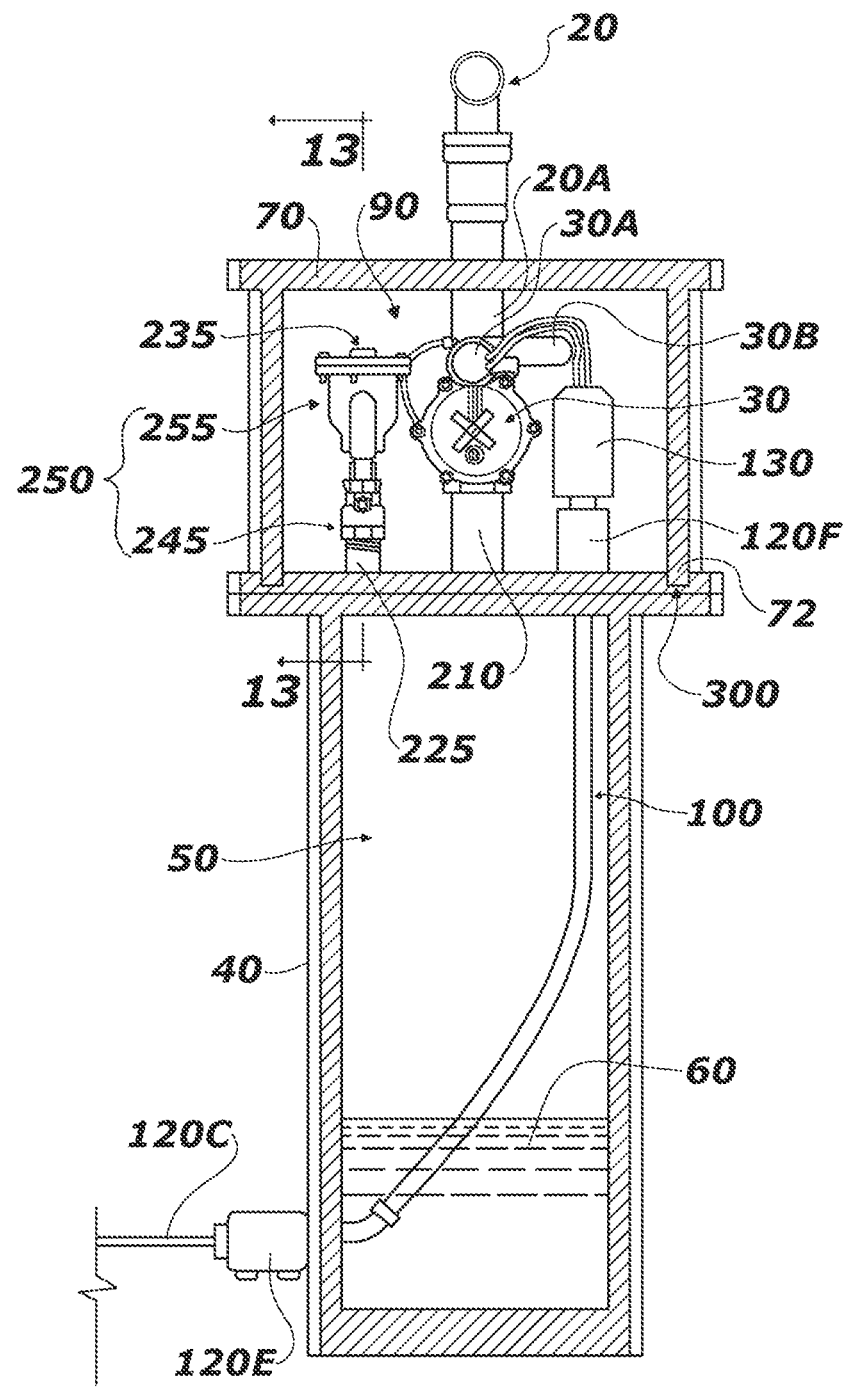
FIG. 9 is a cross-sectional, front side, elevational schematic illustration taken along line 9-9 of FIG. 8, illustrating a reservoir of the riser assembly partially filled with fluid.
Figure 10:
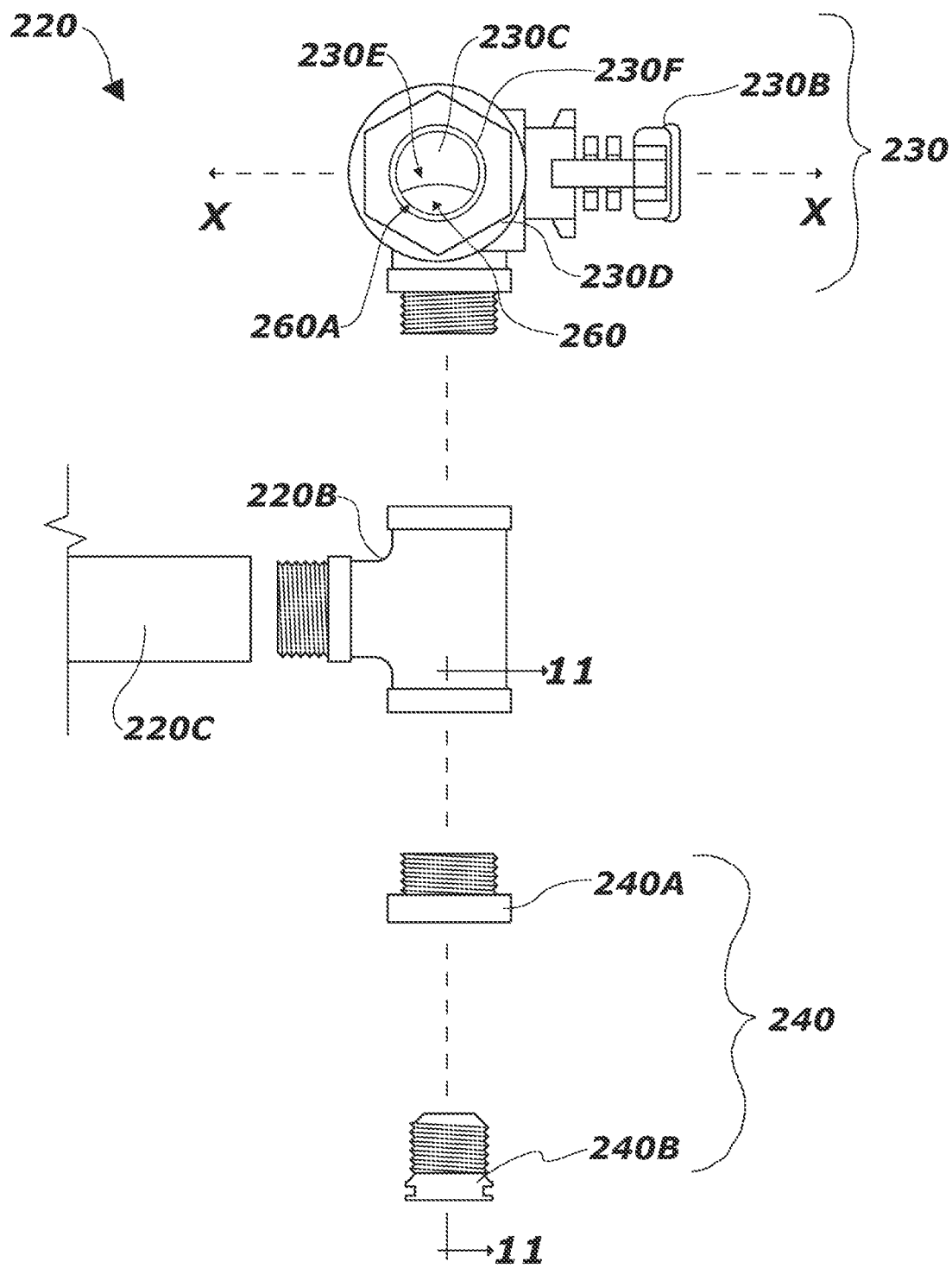
FIG. 10 is a partially-exploded, right side, elevational schematic illustration of a secondary fluid outlet subassembly of, e.g., FIG. 3.

With attention directed principally to FIG. 6, according to the illustrated embodiment of the assembly 10, the fluid inlet 40D may be disposed though the sidewall 40A of the container 40. The fluid outlet 40E may be disposed though a top 40B of the container 40. The fluid inlet 40D may be proximate an end of a fluid intake passageway 180, which may be defined by a fluid intake pipe 190. The fluid outlet 40E may be proximate an additional end of a fluid outlet passageway 200. The fluid outlet passageway 200 may be partially circumscribed and defined by a fluid outlet pipe 210. A secondary fluid outlet 220A may be disposed through the container 40. The secondary fluid outlet 220A may be disposed into a secondary fluid outlet subassembly 220 (FIGS. 1 through 3, 8, 10, and 11). With reference to FIG. 10, the secondary fluid outlet subassembly 220 may include a secondary control valve configured to selectively control flow of pressurized fluid 60 (FIG. 9) from the reservoir 50 (FIG. 9) through the secondary fluid outlet 220A (FIG. 6) and through a pressurized fluid release hole 260A (FIG. 10). In some embodiments, the secondary control valve of the secondary fluid outlet subassembly 220 includes a ball valve subassembly 230 disposed between the secondary fluid outlet 220A (FIG. 6) and the pressurized fluid release hole 260A. The secondary control valve of the secondary fluid outlet subassembly 220 may further include a fluid drain valve 240 and a connection pipe 220C.

As illustrated in FIG. 10, the ball valve subassembly 230 may include a lever 230B operatively connected to a ball 230C. The ball 230C may be snugly encased within a gasket 230F in a housing 230D. The ball 230C has a ball aperture 230E disposed therethrough. The ball aperture 230E may be selectively movable between a closed position, wherein the ball aperture 230E is perpendicular to a fluid expulsion channel 260, and an open position, wherein the ball aperture 230E is aligned to form part of the fluid expulsion channel 260. The ball aperture 230E may be positioned in the open position by an operator applying force to the lever 230B and thereby partially rotating the ball 230C within the housing 230D around an axis illustrated generally as X in FIG. 10. The ball valve subassembly 230 may enable the operator to selectively open and close the fluid expulsion channel 260 by applying pressure to the lever 230B and, thereby, to selectively expel pressurized fluid 60 (FIG. 9) from the reservoir 50 (FIG. 9). In one embodiment, illustrated in FIG. 10, an end of the ball valve subassembly 230 is threaded to allow for rapid detachable operative connection of the ball valve subassembly 230 to a correspondingly threaded branch member 220B. The branch member 220B may be further threaded to allow the branch member 220B to be rapidly detachable from an operative connection by rotational insertion to the container 40 proximate the secondary fluid outlet 220A (FIG. 6). It is, however, to be appreciated that alternative means for attaching the secondary fluid outlet subassembly 220 to the container 40 (FIG. 6) at the secondary fluid outlet 220A (FIG. 6) may also be used.

Figure 11:
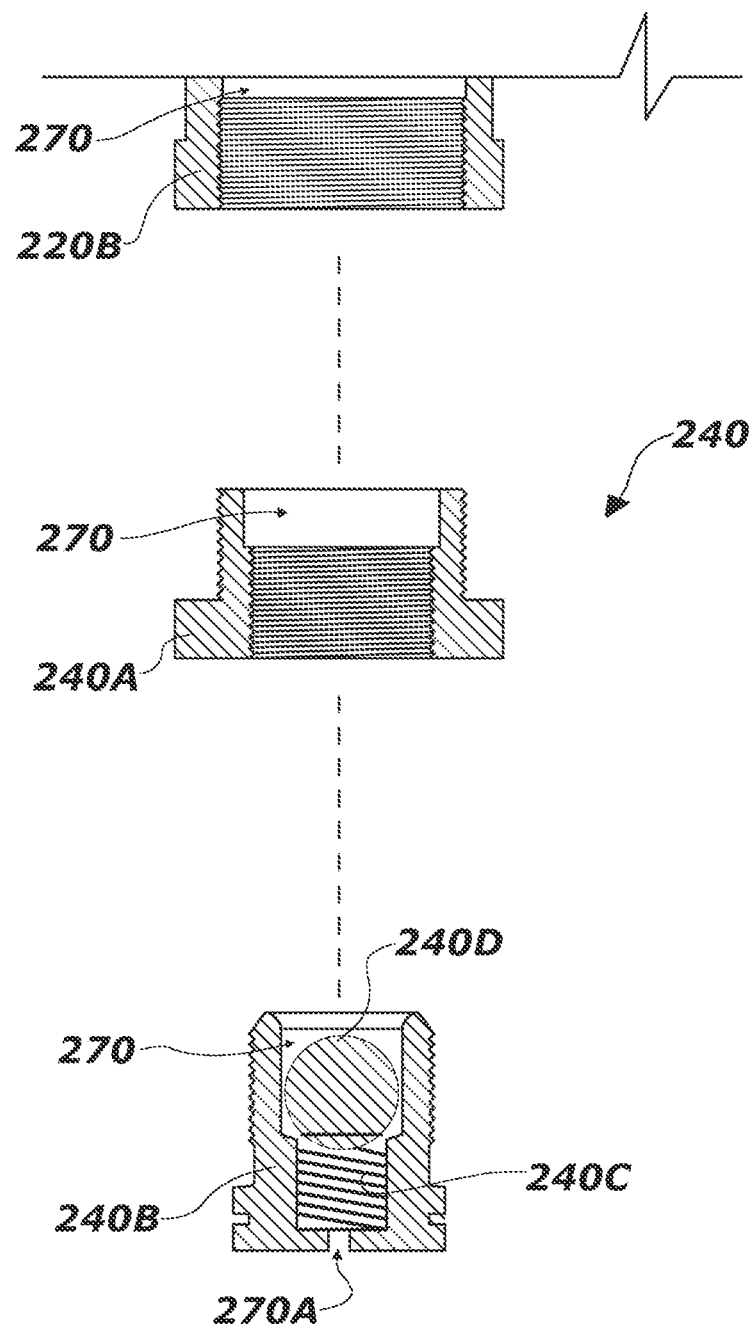
FIG. 11 is a partial cross-sectional, right side, elevational schematic illustration taken along line 11-11 of FIG. 10.

As illustrated in FIGS. 10, and 11, the secondary fluid outlet subassembly 220 may also include a fluid drain valve 240 functioning to allow automatic draining of fluid 60 (FIG. 9) from the reservoir 50 (FIG. 9) through a drain hole 270A after use of the riser assembly 10, when the fluid 60 within the reservoir 50 is no longer pressurized. The fluid drain valve 240 may include a first threaded insert member 240A rotatably insertable into the branch member 220B. The first threaded insert member 240A may have a first portion of a fluid drain passageway 270 disposed and defined therethrough. The fluid drain valve 240 may further include a second threaded insert member 240B rotatably insertable into the first threaded member 240A and having a second portion of the fluid drain passageway 270 disposed and defined therethrough. The second insert member 240B circumscribes a second portion of the fluid drain passageway 270. The fluid drain passageway 270 may be continuously disposed from the secondary fluid outlet 220A (FIG. 6) through the container 40 to the drain hole 270A (FIG. 11). A spring 240C with a stopper 240D may be operatively connected within the second insert member 240B of the fluid drain valve 240. The spring 240C holds the stopper 240D within the second insert member 240B in a spaced relationship to the drain hole 270A such that, as pressurized fluid 60 moves through the fluid drain passageway 270 toward the drain hole 270A, the stopper 240D is forced toward the drain hole 270A and connects the second insert member 240B, closing the fluid drain passageway 270. Also, as pressure is removed from fluid 60 within the fluid drain passageway 270, the stopper 240D is forced by the spring 240C away from the drain hole 270A, thereby opening the fluid drain passageway 270 and allowing fluid 60 to exit from the container 40 through the fluid drain passageway 270 and out of the drain hole 270A.

With attention to FIG. 9, according to the illustrated embodiment, the riser assembly 10 may include an air pipe 225 having an air passageway 235 disposed therethrough. The air passageway 235 is disposed through the container 40. The air pipe 225 may function to release air from the reservoir 50 through the air passageway 235 when fluid 60 is initially introduced under pressure into the reservoir 50, displacing air initially contained within the reservoir 50. The air pipe 225 may also allow air to re-enter the reservoir 50 when fluid 60 is drained from the riser assembly 10 after or during use. In the embodiment illustrated, the air pipe 225 is adapted for rapid, stable operative connection to means for selectively controlling release of air through the air pipe 225. For example, such means for controlling release of air may include an air release valve subassembly 250 having a second ball valve subassembly 245 and an air drain valve subassembly 255.

Referring principally to FIG. 12, the second ball valve subassembly 245 may include a second lever 245B operatively connected to a second ball 245C. The second ball 245C may be snugly encased within a second gasket 245F in a second housing 245D and may have a second ball aperture 245E disposed therethrough. The second ball aperture 245E may be selectively movable between a closed position, wherein the second ball aperture 245E is perpendicular to the air passageway 235, and an open position, wherein the second ball aperture 245E is aligned to form a part of the air passageway 235. The second ball aperture 245E may be positioned in the open position by an operator applying force to the second lever 245B to thereby partially rotate the second ball 245C within the second housing 245D around an axis illustrated generally as X' in FIG. 12.

Referring principally to FIGS. 13A and 13B, the air drain valve subassembly 255 may include a float 255A pivotally connected by a float arm 255B to a float pivot pin 255C. The float pivot pin 255C may be operatively connected to an air drain valve cover 255D by a bracket 255E. The float 255A may be disposed within an air passage corridor 235B circumscribed and defined by a drain valve body 255F and an air drain valve cover 255D. The air drain valve cover 255D has an air drain hole 235C disposed therethrough and is selectively connected to a connection gasket 255I and to the drain valve body 255F by drain valve body fasteners 255J. In standard operation, displaced air travels from the reservoir 50 through the air passageway 235 and the air passage corridor 235B, e.g., when fluid 60 is initially introduced under pressure into the reservoir 50. When the fluid 60 reaches the float 255A, the float 255A floats upwardly around the float's pivotal connection with the pivot float pin 255C. As the float 255A floats upwardly, a float stop 255H, which may be attached to the float arm 255B, is moved upwardly to cover an orifice 235D at an end of the air drain hole 235C; thus preventing expulsion of pressurized liquid through the air drain hole 235C. After use of the riser assembly 10, pressure may be withdrawn from the fluid 60, and fluid 60 within the air passage corridor 235B may recede, causing the float 255A and pivot float pin 255C to move downward and, thereby, unstop the orifice 235D and allow air to re-enter the air passage corridor 235B through the orifice 235D.

Although the air pipe 225 may be adapted for rapid, stable operative connection to means for controlling release of air through the air pipe 225, and though such means for controlling release of air may include the air release valve subassembly 250 (FIG. 9) having the second ball valve subassembly 245 and the air drain valve subassembly 255, it is to be appreciated that the air pipe 225 may alternatively be adapted for connection to alternative structures that function to control release of air from the reservoir 50 through the air passageway 235 and to automatically close such passageway 235 to prevent escape of fluid 60 when such air passageway 235 fills with pressurized fluid 60.

Figure 8:
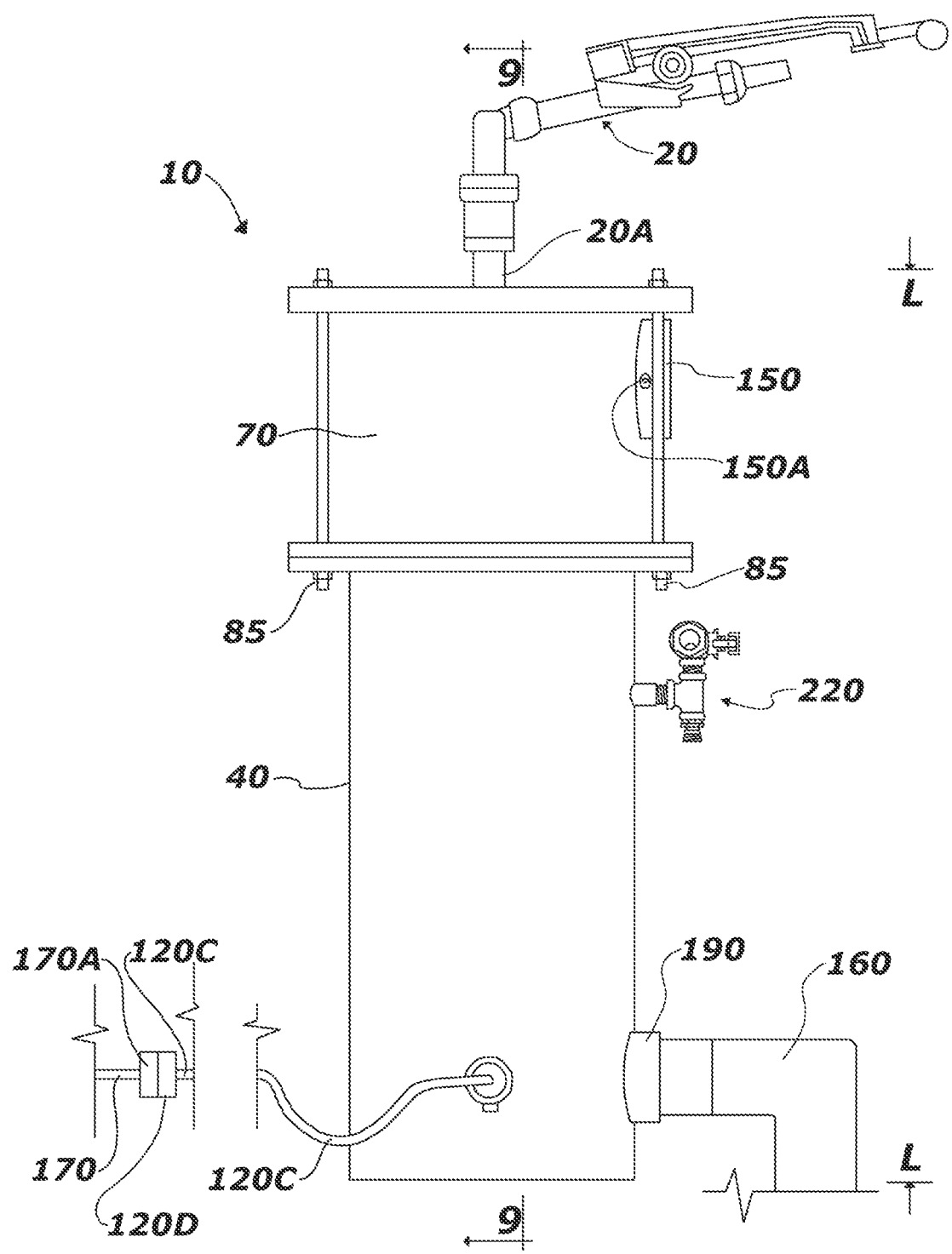
FIG. 8 is a right side, elevational schematic illustration of the riser assembly of FIGS. 1 through 7, in operative connection with a fluid dispenser, the fluid dispenser being a sprinkler with associated control valve configured to selectively control expulsion of fluid through the sprinkler.

With reference to FIG. 8, the riser assembly 10 may function to provide a pressurized fluid reservoir 50 (FIG. 9) and a stable, sturdy, yet adjustably-weighted support base for a selectively-controlled fluid dispenser (e.g., a directional sprinkler 20 operatively connected to the signal processor 130 (FIG. 9) and the control valve 30 (FIG. 9)) in a single, connected configuration that may be rapidly, conveniently, efficiently, and detachably connectable to a pressurized fluid source 160 (e.g., a subterranean pipe attached to a pump) and a signal source 170 (e.g., a signal-carrying wire, cable, or other relay, operatively connected, whether via a wire or wirelessly, to a signal sender). In an embodiment, the configuration of the riser assembly 10 and the reservoir 50 (FIG. 9) and the weight of the pressurized fluid 60 (FIG. 9) within the reservoir 50 (FIG. 9) may facilitate stable operation of a rotary sprinkler 20 dispensing fluid pressurized at up to 200 pounds per square inch (up to 200 psi (up to about 1379 kPa)) without need for extensive excavation, concrete thrust blocks, or other permanent anchors by simply placing the riser assembly 10 in a comparatively-shallow hole in the ground (i.e., a hole that may be less than one half the depth of the greatest longitudinal dimension L of the riser assembly 10) and using sand, soil, and other natural fill material located proximate the shallow hole as backfill after the riser assembly 10 is placed in the shallow hole. In such installations, about half of the height of the riser assembly 10 (i.e., half of the greatest longitudinal dimension L) may extend above the ground or other structure in which the riser assembly 10 is installed.

The structure of the illustrated embodiments of the riser assembly 10 may also function to allow for disposition of the signal carrier 120 (FIG. 6) from outside the container 40 through the channel 110 (FIG. 6) circumscribed by the conduit 100 to carry a signal through the channel 110 to the signal processor 130 (FIG. 9) situated within the cavity 90. The signal processor 130 may be operatively connected to means for selectively controlling expulsion of fluid 60 through the sprinkler 20 in response to a signal received through the signal carrier 120 (FIG. 6). According to the embodiment illustrated in FIG. 9, e.g., such means include the control valve 30. The channel 110 (FIG. 6) may be, accordingly, insulated and protected not only by the conduit 100 and container 40 but also, during standard operation of the riser assembly 10, by the pressurized fluid 60 within the reservoir 50. Moreover, as illustrated in FIG. 8, the signal carrier 120 (FIG. 6) may be operatively connectable through a detachable cord 120C to a connection plug 120D and may, thus, be easily, rapidly, efficiently, and detachably connected to a corresponding signal source outlet 170A for receiving a signal from a signal source 170 without need of additional tools. In an embodiment, the detachable cord 120C may be detachably connected to a remainder of the signal carrier 120 through a first detachable signal carrier coupler 120E (FIG. 9).

Figure 14:
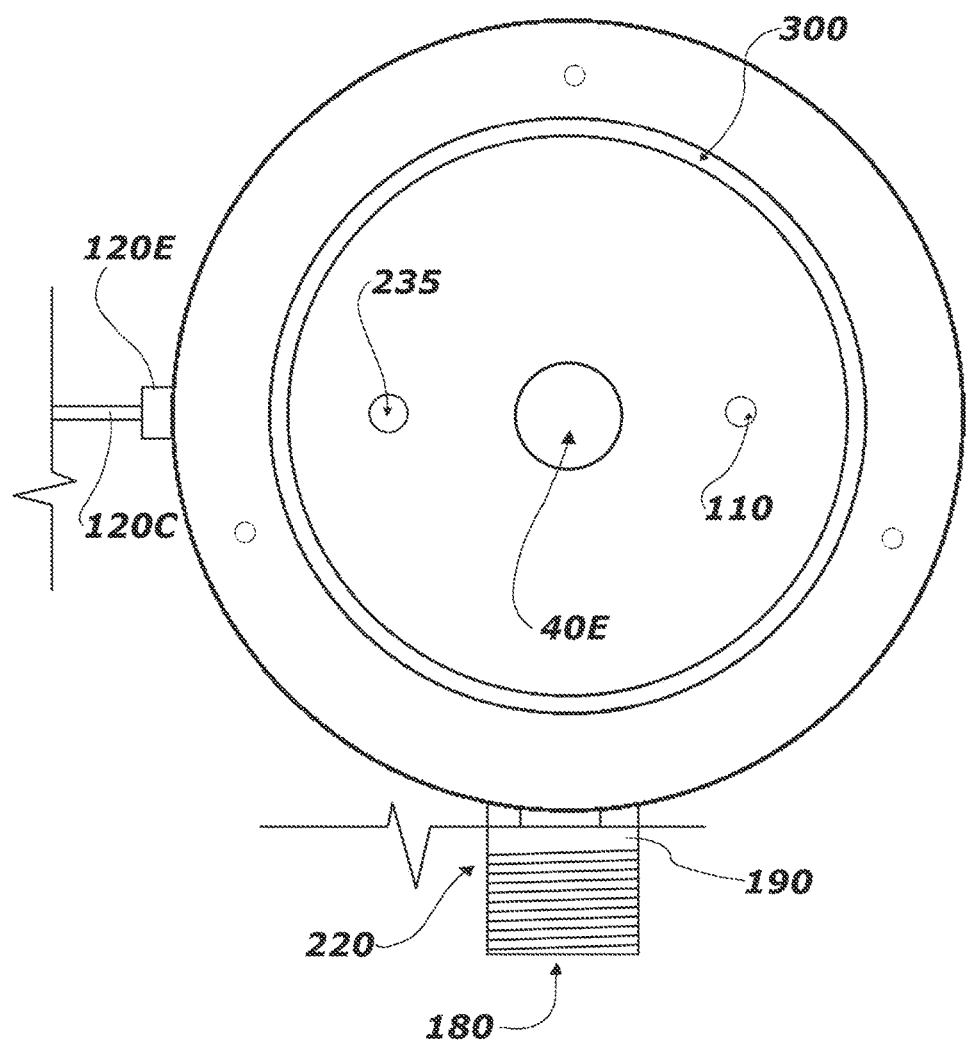
FIG. 14 is a top plan schematic illustration of a container of the riser assembly of FIGS. 1 through 13B, without a cover in place.

With reference to FIG. 9, the structure of an embodiment of the riser assembly 10 may further function to facilitate alignment, configuration, protection, and support of the signal processor 130, the sprinkler 20, the control valve 30 (for selectively controlling expulsion of pressurized fluid 60 through the sprinkler 20), and the air release valve subassembly 250 in operative combination and to provide an adjustably-weighted riser assembly 10 containing the reservoir 50 for containing pressurized fluid 60 that rapidly and easily forms sturdy, operative connections with such sprinkler 20, control valve 30, and air release valve subassembly 250. With reference to FIG. 4, according to the illustrated embodiment of the riser assembly 10, the cover 70 includes a lower cover edge 72. The upper container surface 40I of the container 40 may have, defined therein, a groove 300 (see also FIG. 14). The groove 300 may be configured to snugly receive therein the lower cover edge 72 of the cover 70. As such, in assembling the riser assembly 10, inserting the lower cover edge 72 into the groove 300 may position the cover 70 in appropriate position relative to the container 40. As illustrated in FIG. 6, such positioning, therefore, may properly align the aperture 80 in the cover 70 with the fluid outlet 40E extending from the container 40. As illustrated in FIG. 9, such position also, consequently, may place the sprinkler 20 and sprinkler supply line 20A in proper alignment with the fluid outlet pipe 210. Accordingly, such alignment may be accomplished without the need for additional bracing. However, in some embodiments, additional bracing may nonetheless be utilized.

Figure 15:
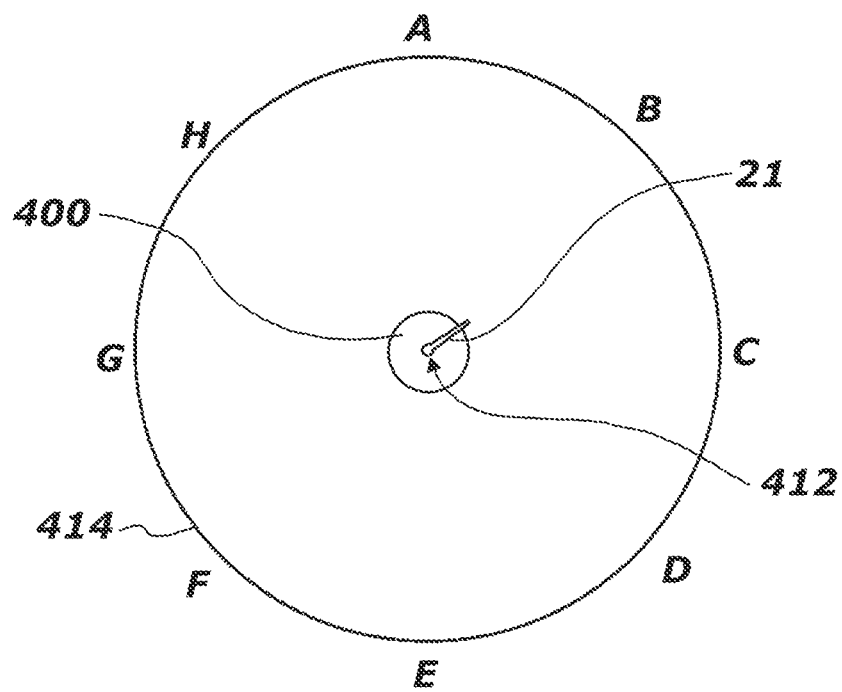
FIG. 15 is a top plan schematic illustration of a fluid distribution area of a conventional, non-pressure-adjusting fluid dispenser in operative connection with a riser assembly according to embodiments of the present disclosure.

A riser assembly 400 according to the present disclosure, which riser assembly 400 may be configured as the riser assembly 10 illustrated in FIGS. 1 through 14, may be further configured to be used with a fluid dispenser such as a big riser sprinkler. For example, the riser assembly 400 may be configured to be used with a conventional, non-pressure-adjusting fluid dispenser 21, as illustrated in FIG. 15. Such a fluid dispenser may have a control valve configured to expel fluid at an essentially-constant pressure as the dispenser pivots about a central pivot point 412, regardless of the dispenser's degree of pivoting. Therefore, the lateral distance at which the fluid will be maximally dispensed from the non-pressure-adjusting fluid dispenser 21 (e.g., from the central pivot point 412) may be the same distance at an original position point, for example, point A; as at point B, once the dispenser 21 has pivoted 45 degrees from the original position point A; as at point C, once the dispenser 21 has pivoted 90 degrees from point A; as a point D, once the dispenser 21 has pivoted 135 degrees from point A; as a point E, once the dispenser 21 has pivoted 180 degrees from point A; as a point F, once the dispenser 21 has pivoted 225 degrees from point A; as a point G, once the dispenser 21 has pivoted 270 degrees from point A; and as a point H, once the dispenser 21 has pivoted 315 degrees from point A. Therefore, the resulting fluid distribution area 414 using the riser assembly 400 in operative connection with the conventional, non-pressure-adjusting fluid dispenser 21 may define a substantially circular shape.

Figure 16:
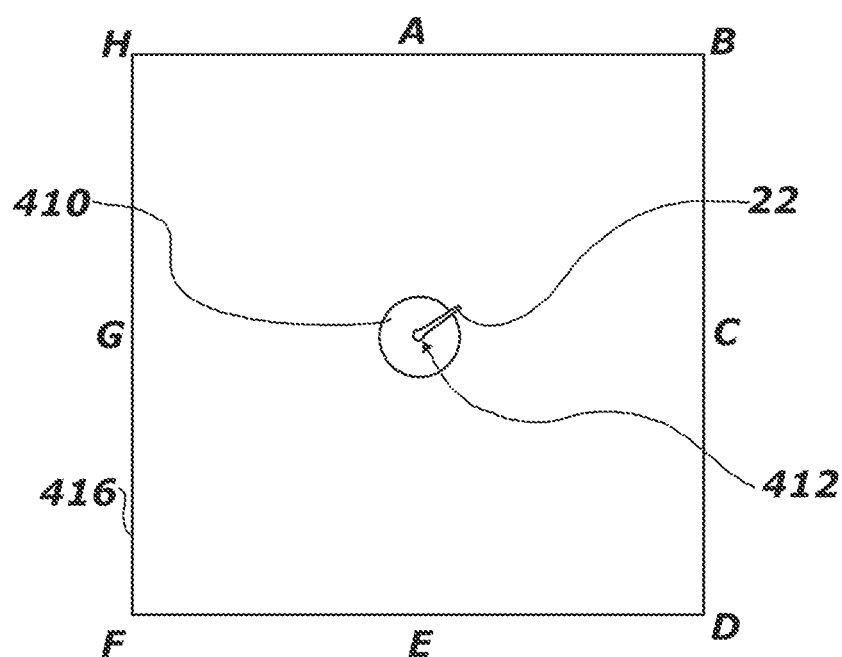
FIG. 16 is a top plan schematic illustration of a fluid distribution area of a pressure-adjusting fluid dispenser in operative connection with a riser assembly according to embodiments of the present disclosure.

With particular attention to FIG. 16, a riser assembly 410 of the present disclosure, which may be configured as the riser assembly 10 illustrated in FIGS. 1 through 14, may also be configured to be used with a pressure-adjusting fluid dispenser 22 having a control valve configured to selectively adjust fluid pressure of fluid expelled through the dispenser 22 as the dispenser 22 pivots about the central pivot point 412. The control valve of the pressure-adjusting fluid dispenser 22 may be configured to be remotely programmed by an operator to set the appropriate fluid pressure at which to expel fluid based upon the dispenser's 22 present degree of pivoting from a predetermined original position point. According to the settings of the embodiment of the pressure-adjusting fluid dispenser 22 operatively connected to the riser assembly 410, the fluid pressure at which fluid is expelled by the dispenser 22 at original position point A is at a minimum and is at a maximum at point B, at which point the dispenser 22 has pivoted 45 degrees from point A; again at a minimum at point C, at which the dispenser 22 has pivoted 90 degrees from point A; again at a maximum at point D, at which the dispenser 22 has pivoted 135 degrees from point A; again at a minimum at point E, at which the dispenser 22 has pivoted 180 degrees from point A; again at a maximum at point F, at which the dispenser 22 has pivoted 225 degrees from point A; again at a minimum at point G, at which the dispenser 22 has pivoted 270 degrees from point A; again at a maximum at point H, at which the dispenser 22 has pivoted 315 degrees from point A; and then again at a minimum upon returning to point A, 0 degrees from point A. The resulting fluid distribution area 416 may, therefore, be substantially square shaped. It should be understood that original position point A of FIG. 16 need not necessarily be the twelve-o'clock position. Further, in other embodiments, the control valve of the pressure-adjusting fluid dispenser 22 may alternatively be programmed such that the fluid distribution area is shaped other than a square or circle.

With reference to FIGS. 17 through 33, illustrated are embodiments of riser assemblies, according to the present disclosure, having, in addition to any or all of the features discussed above with regard to FIGS. 1 through 16, at least one utility conduit communicating through at least one area of the container. The utility conduit is disposed at least partially within the reservoir and enables access to a resource utilized in the riser assembly, such as fluid or power, or enables transportation or securing of the riser assembly.

With reference specifically to FIGS. 17 through 25, illustrated is an embodiment of a riser assembly 510, having a utility conduit 780 configured to enable a secondary use of the fluid 60 (FIG. 9) within the reservoir of the riser assembly 510, wherein access to the fluid for the secondary use is recessed within the container of the riser assembly 510.

Figure 22:
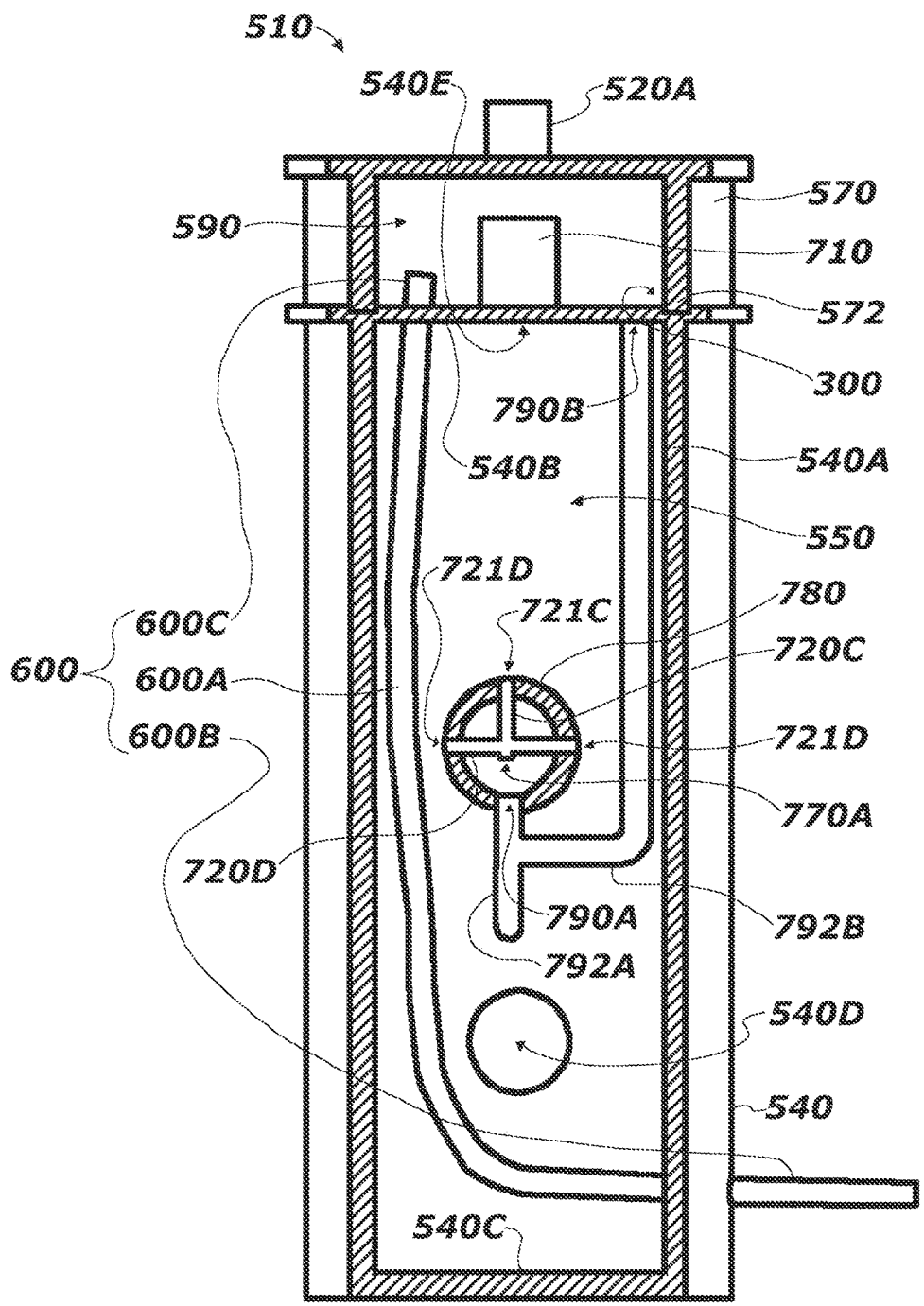
FIG. 22 is a cross-sectional, rear side, elevational schematic illustration taken along line 22-22 of FIG. 17.

With reference to FIG. 22, the riser assembly 510 includes a container 540 that has a sidewall 540A, a top 540B, and a bottom 540C. The container 540 at least partially circumscribes a reservoir 550 that is configured to receive and hold (also referred to herein as "containing") the pressurized fluid 60 (FIG. 9).

A fluid inlet 540D communicates through the container 540. The fluid inlet 540D may communicate through a lower area of the sidewall 540A of the container 540. The fluid inlet 540D passes through a fluid intake pipe 690 (FIGS. 19 through 21), which may be connectable to the pressurized fluid source 160 (FIG. 8). The fluid inlet 540D may be configured to enable filling the reservoir 550 (FIG. 22) with the pressurized fluid 60 (FIG. 9) from a fluid source (e.g., the pressurized fluid source 160 (FIG. 8)). When installed for use, the fluid intake pipe 690 and the fluid inlet 540D may be disposed below an upper surface of the ground or other structure in which the riser assembly 510 is installed. Accordingly, the riser assembly 510 may be configured to be filled from a buried fluid source.

A fluid outlet 540E also communicates through the container 540, e.g., through the top 540B of the container 540. The fluid outlet 540E passes through a fluid outlet pipe 710. The fluid outlet pipe 710 may define the fluid outlet passageway 200 (FIG. 6) as described above and may be in alignment with a sprinkler supply line 520A (such as the sprinkler supply line 20A (FIG. 8)).

The container 540 also includes a cover 570, which may be the same or similar to the cover 70 (FIGS. 1 through 6) discussed above. The cover 570 may be selectively connected to the top 540B of the container 540 by, for example, fasteners (e.g., fasteners 85 (FIGS. 1 through 8). The cover 570 may define an aperture such as aperture 80 (FIG. 6) for containing the sprinkler supply line 520A, which may communicate through the container 540, e.g., through the top 540B of the container 540. The cover 570 and an upper surface 5401 (FIG. 23) of the top 540B (FIG. 22) of the container 540 may define therebetween a cavity 590. During operation, the cavity 590 may be substantially free of fluid and may be isolated from the reservoir 550 by at least the top 540B of the container 540.

As illustrated in FIGS. 22 through 25, the cover 570 of the riser assembly 510 may be configured to be snugly received along a lower cover edge 572 within the groove 300, which may be defined within an upper surface 5401 of the top 540B of the container 540.

In some embodiments, a conduit 600 circumscribing a channel such as channel 110 (FIGS. 6 and 7) communicates through the container 540 of the riser assembly 510. The conduit 600 may contain and isolate from the reservoir a signal carrier 120 (FIGS. 6 and 7). In some embodiments, a power-conveying cable may pass through the conduit 600. An intermediate conduit portion 600A of the conduit 600 is disposed within the reservoir 550 and is configured to exclude fluid 60 (FIG. 9) within the reservoir 550 from the interior of the conduit 600 (e.g., from the channel 110 (FIGS. 6 and 7)). A first conduit portion 600B may communicate through the sidewall 540A of the container 540 and may connect to the intermediate conduit portion 600A and to a signal carrier entry area (e.g., the signal carrier entry area 120A (FIG. 4) outside the container 540. A second conduit portion 600C may communicate through the top 540B of the container 540 and may connect to the intermediate conduit portion 600A and to a signal carrier exit area (e.g., the signal carrier exit area 120B (FIG. 4)) outside the container 540. Accordingly, a signal may be carried through the conduit 600, entering the container 540 via the first conduit portion 600B, passing through the reservoir 550 within the container 540 via the intermediate conduit portion 600A, and exiting the container 540 via the second conduit portion 600C to communicate the signal to a receiving device within the cavity 590 of the riser assembly 510. The receiving device may include the signal processor 130 (FIG. 9), which may be in operable communication with other devices situated within the cavity 590. For example, the cavity may contain the signal processor 130, the control valve 30, the solenoid 30A, the pressure regulator 30B, the second signal carrier coupler 120F, the air pipe 225, the air passageway 235, and the air release valve subassembly 250 (including the second ball valve subassembly 245 and the air drain valve subassembly 255) as described above and illustrated in FIGS. 9 through 13B.

In other embodiments, the riser assembly 510 may be configured to convey a signal wirelessly. In such embodiments, the riser assembly 510 may not include the conduit 600.

The container 540 (including the sidewall 540A, the top 540B, and the bottom 540C), the cover 570, and the conduit 600 (if present) may each be formed from HDPE and may be configured to withstand about 200 psi (about 1379 kPa) of fluid pressure.

As illustrated in FIGS. 17 through 25, the riser assembly 510 also includes a utility conduit 780 that communicates through at least one area of the container 540. For example, the utility conduit 780 may communicate through an area of the sidewall 540A of the container 540 proximate to a lateral and longitudinal midpoint of the container 540, as illustrated in FIG. 18. The container 540 may define an opening 782 that exposes the utility conduit 780 through the sidewall 540A of the container 540. In some embodiments, a door (not shown) may be included with the riser assembly 510 and may be configured to selectively cover the opening 782 that exposes the utility conduit 780. Such a door may be the same as or similar to the door 150 (FIGS. 1 through 6) discussed above and may also include a lock, such as the lock 150A (FIGS. 1 and 3), configured selectively secure the door (e.g., such as door 150) to the sidewall 540A of the container 540. In other embodiments, the opening 782 exposing the utility conduit 780 is not covered by a door.

As illustrated in FIGS. 22 through 25, the utility conduit 780 may be disposed, at least partially, within the reservoir 550 defined by the container 540. A volume within the utility conduit 780 may, therefore, be isolated from fluid (e.g., fluid 60 (FIG. 9)) contained within the reservoir 550.

Figure 24:
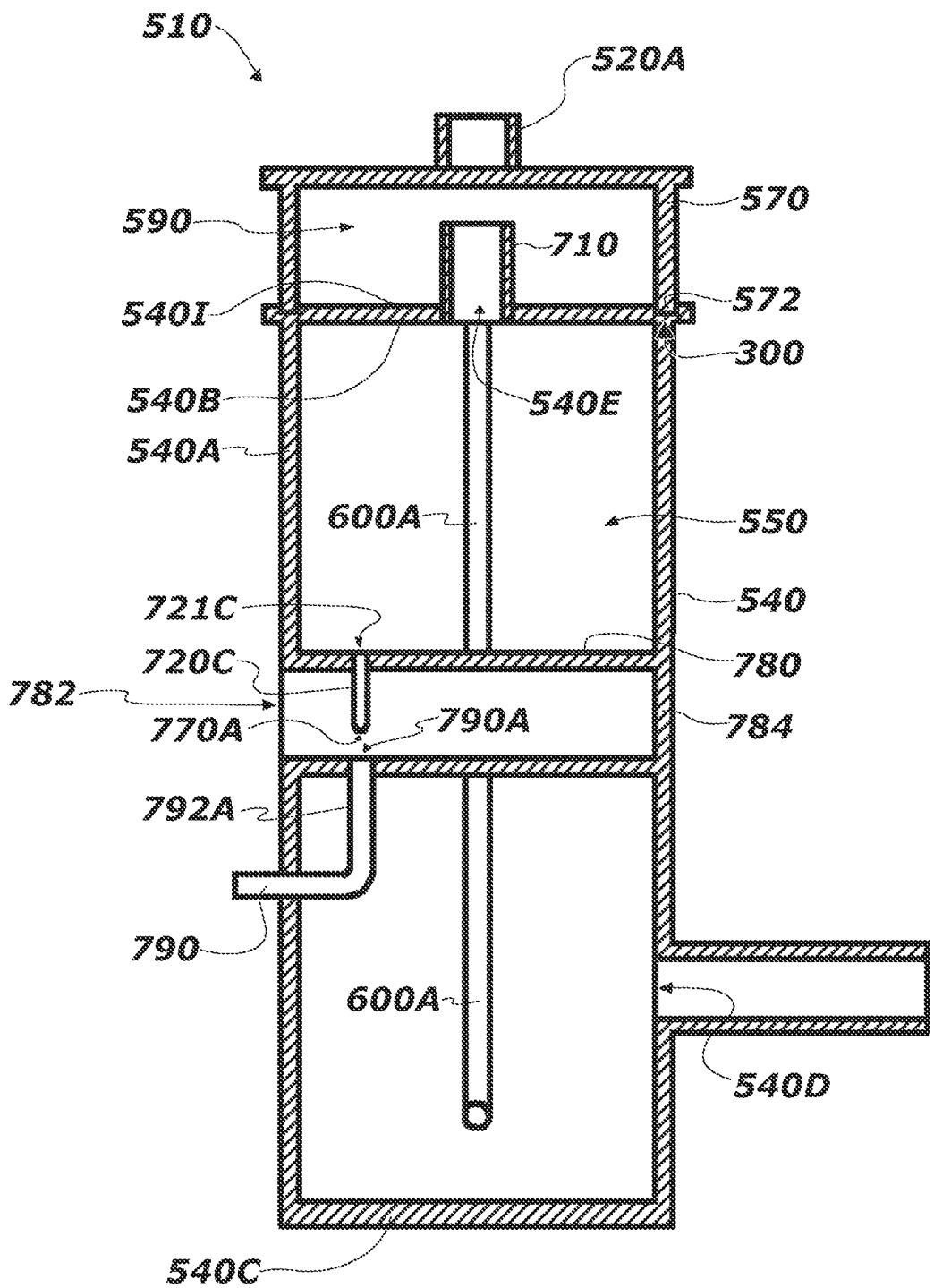
FIG. 24 is a cross-sectional, right side, elevational schematic illustration taken along line 24-24 of FIG. 17.

The utility conduit 780 may define an essentially cylindrical shape that traverses a width (e.g., diameter) of the container 540, e.g., between an open end defining the opening 782 to a closed end 784. The closed end 784 may be defined by an area of the sidewall 540A of the container 540, as illustrated in FIG. 24. Accordingly, the volume within the utility conduit 780 may occupy a space having a longest dimension about equal to a diameter of the container 540, and the utility conduit 780 may define a central axis that lies within a plane essentially parallel with a plane defined by a surface of the bottom 540C of the container 540.

In other embodiments (not shown), the utility conduit 780 may define a longest dimension that is greater than the width (e.g., diameter) of the container 540. For example, such a utility conduit 780 may be disposed to extend into the reservoir 550 from the opening 782 at an angle relative to the surface of the sidewall 540A of the container 540. As another example, the utility conduit 780 may extend beyond the sidewall 540A of the container 540 such that the opening 782 of the utility conduit 780 is not aligned with an outer surface of the sidewall 540A of the container 540.

In some embodiments (not shown), the utility conduit 780 may extend only partially within the reservoir 550. In such embodiments, the opening 782 of the utility conduit 780 may align with the sidewall 540A of the container 540, while a second end of the utility conduit 780 (e.g., the closed end 784) may be disposed within the reservoir 550 in the container 540. Therefore, the utility conduit 780 may extend only partially along a width (e.g., diameter) of the container 540 and, as such, may be recessed within the reservoir 550 without contacting the sidewall 540A of the container 540 opposite the opening 782 of the utility conduit 780.

Figure 25:
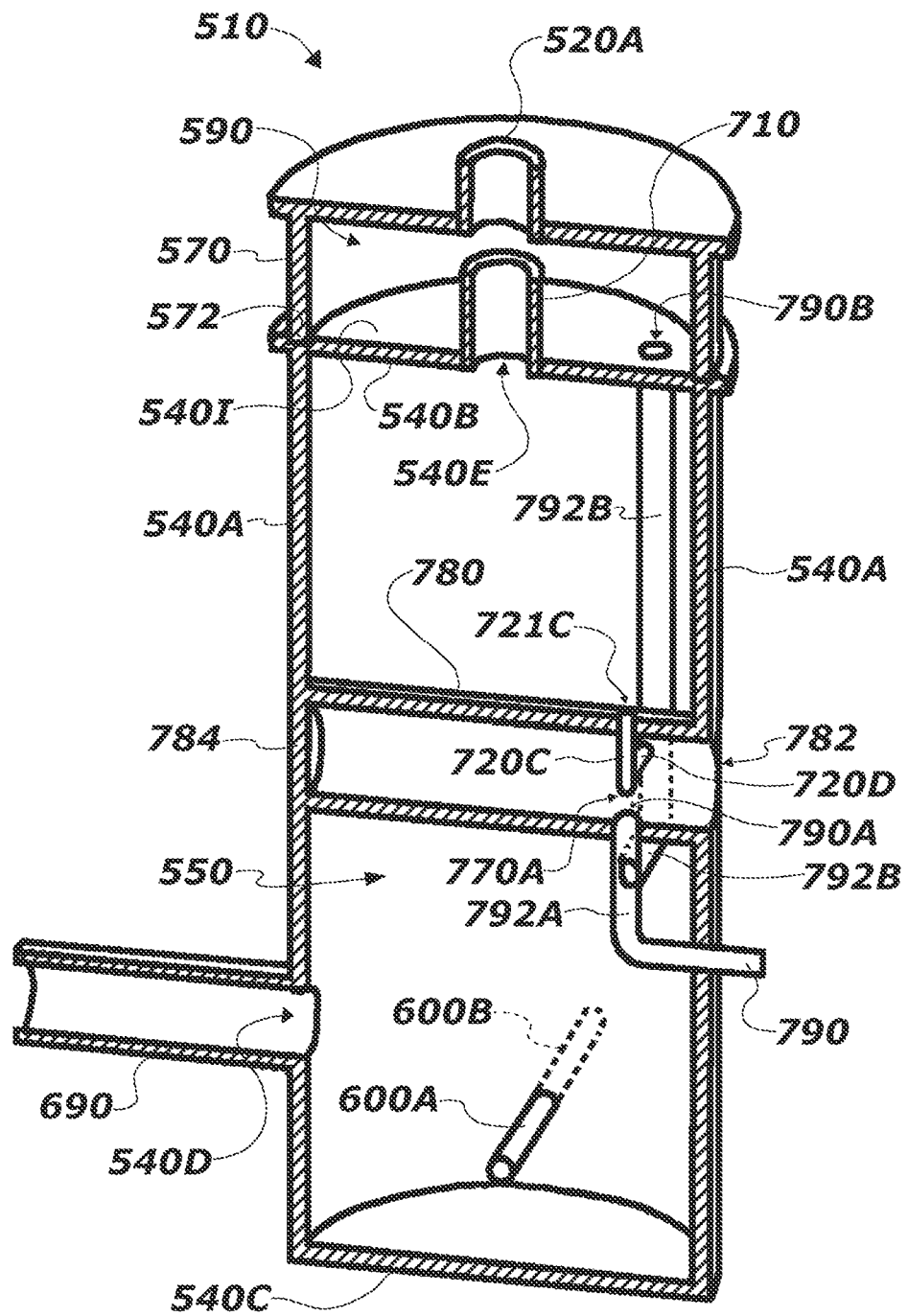
FIG. 25 is a cross-sectional, top and left side, perspective schematic illustration taken along line 25-25 of FIG. 17.

The utility conduit 780 may be formed from the same material from which the container 540 is formed, e.g., HDPE. Accordingly, the utility conduit 780 may be bonded, fused, or otherwise seamlessly joined to the sidewall 540A of the container 540, as illustrated in FIGS. 24 and 25. Accordingly, the risk of fluid leaking, undesirably, into the volume of the utility conduit 780 may be minimized.

According to the embodiment illustrated in FIGS. 17 through 25, the utility conduit 780 is configured to allow selective access to the fluid 60 (FIG. 9) within the reservoir 550 to enable a secondary usage of the fluid 60. Therefore, for example, the riser assembly 510 may be installed and pressurized fluid 60 filled into the reservoir 550, to both provide a weighted stability to the riser assembly 510 and to provide a source for fluid 60 to be expelled through a sprinkler (e.g., fluid dispenser 20 (FIG. 9)). The same pressurized fluid 60 within the reservoir 550 may be accessed via the utility conduit 780 to allow a secondary use of the fluid 60, e.g., to supply water to a connectable water hose or to dispense the fluid 60 from the reservoir other than through the sprinkler (e.g., fluid dispenser 20 (FIG. 9)).

Figure 23:
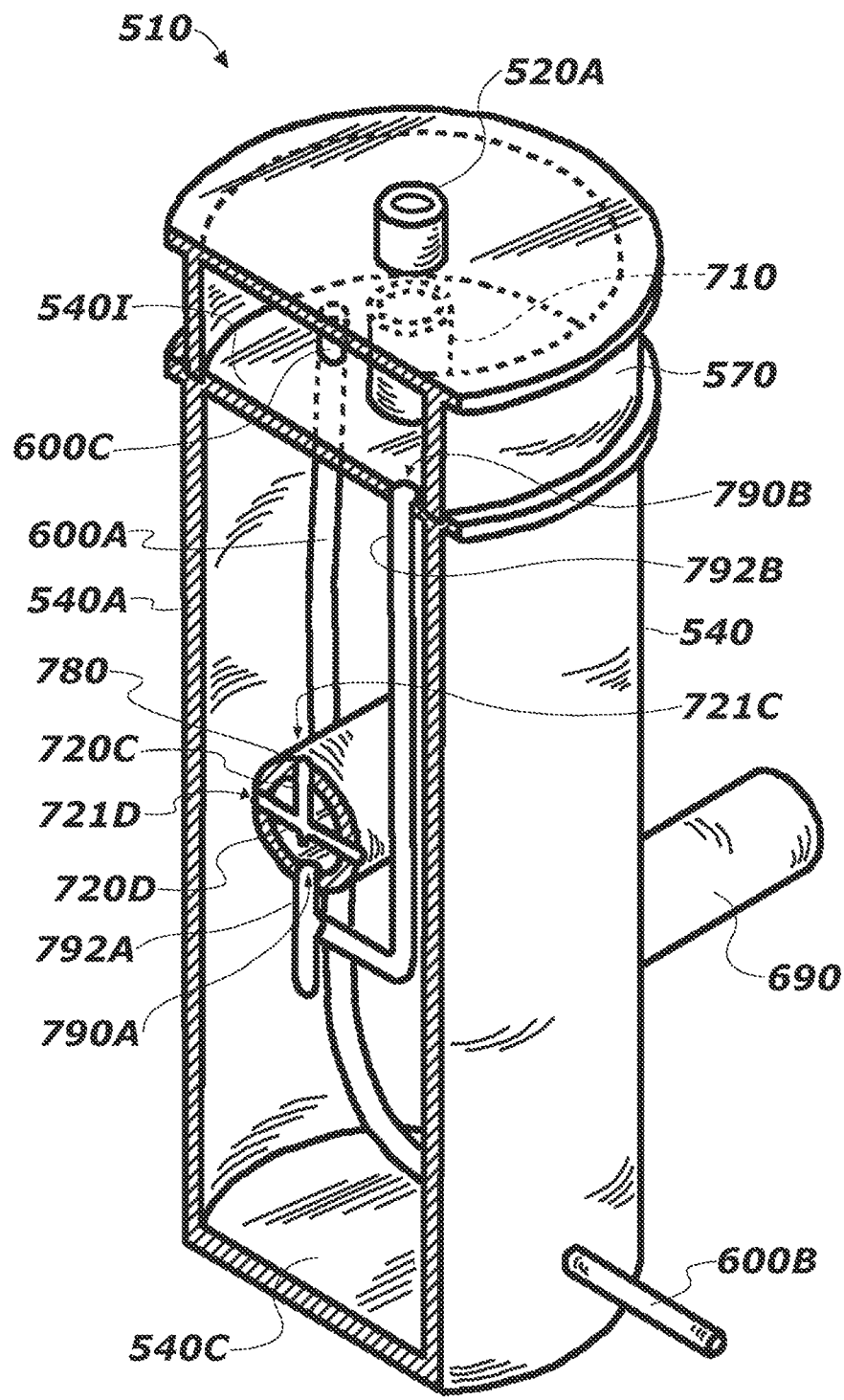
FIG. 23 is a cross-sectional, top, rear, and right side, perspective schematic illustration taken along line 23-23 of FIG. 17.

To enable the secondary use of the fluid 60, the utility conduit 780 may include at least one connection pipe 720C that communicates through the utility conduit 780, e.g., through a sidewall of the utility conduit 780, to the reservoir 550. As illustrated in FIG. 22, the utility conduit 780 may include the connection pipe 720C and another connection pipe 720D. In some embodiments (not shown), additional connection pipes may be included. The connection pipe 720C and the another connection pipe 720D, and, if present, any additional connection pipes, may communicate with one another, e.g., as illustrated in FIGS. 22 and 23.

Each of the connection pipe 720C and the another connection pipe 720D may communicate, through a different area of the utility conduit 780, to the reservoir 550. For example, the connection pipe 720C may communicate via a connection pipe inlet 721C defined in an upper area of the utility conduit 780, and the connection pipe 720C may extend downward into the volume within the utility conduit 780, aligning with a radius of the utility conduit 780. The another connection pipe 720D may communicate by one or more other connection pipe inlets 721D defined in side areas (which may be opposite one another) of the utility conduit 780 and may traverse a width (e.g., a diameter) of the volume within the utility conduit 780.

The connection pipe 720C, the another connection pipe 720D, and any additional connection pipes (if present) communicating through the utility conduit 780 to the reservoir 550 may be operationally joined at a drain hole 770A, which may be defined in a central, lower area of the connection pipe 720C, the another connection pipe 720D, and any additional connection pipes (if present). The drain hole 770A may be operationally connected to fluid outlet subassembly (such as the secondary fluid outlet subassembly 220 (FIGS. 8, 10, and 11), configured to accommodate selectively opening and closing of the drain hole 770A to control dispensing of fluid 60 from the reservoir 550 into the utility conduit 780. Accordingly, the embodiment of the riser assembly 510 illustrated in FIGS. 17 through 25 may enable the secondary fluid outlet subassembly 220 discussed above and illustrated in FIGS. 1 through 3, 8, 10, and 11, to be recessed within the outer boundaries (also referred to herein as the "periphery") of the reservoir 550 in the container 540 of the riser assembly 510, rather than disposed wholly external to the reservoir 550. In such an embodiment, then, the secondary fluid outlet subassembly 220 connected to the drain hole 770A within the utility conduit 780 may be more protected from the elements and less obtrusive than the secondary fluid outlet subassembly 220 disposed external to the reservoir 550 as illustrated in FIGS. 1 through 3, for example.

The connection pipe 720C, the another connection pipe 720D, and any additional connection pipes (if present) may be formed from the same material from which the utility conduit 780 or the container 540 is formed, such as HDPE. Therefore, the connection pipe 720C, the another connection pipe 720D, and any additional connection pipes (if present) may be bonded, fused, or otherwise seamlessly adjoined to the utility conduit 780.

Because the drain hole 770A may be disposed within the interior of the utility conduit 780, in some embodiments of the riser assembly 510, such as that illustrated in FIGS. 22 through 25, the utility conduit 780 may further include a drain outlet 790 that communicates between the volume within the utility conduit 780 and a location exterior to the container 540. As illustrated in FIG. 24, for example, the drain outlet 790 may communicate with the interior volume of the utility conduit 780 via a drain lower inlet 790A, which may comprise an opening defined in a lower area of the utility conduit 780, thereby accommodating draining of fluid from within the interior of the utility conduit 780 by gravity. The drain lower inlet 790A may lead to a lower drain conduit 792A that communicates through the sidewall 540A of the container 540 to the location exterior to the container 540, e.g., to an external drainage system. Accordingly, the riser assembly 510 may be configured to allow access to fluid 60 within the reservoir 550 by selectively opening the drain hole 770A, such that fluid 60 from the reservoir 550 will pass into the connection pipe 720C and the another connection pipe 720D and into the interior of the utility conduit 780, where it may exit the riser assembly 510 by passing out of the utility conduit 780 and the container 540 via the lower drain conduit 792A, if not exiting by a hose selectively attachable over the drain hole 770A, for example.

In embodiments in which the drain hole 770A is connected to a secondary fluid outlet subassembly (such as the secondary fluid outlet subassembly 220 (FIG. 10)), the secondary fluid outlet subassembly may be configured to be selectively connectable to an operable hose, such as a garden hose, in which case fluid 60 may pass from the drain hole 770A into the volume of the utility conduit 780, e.g., due to leaks at the connection point between the hose and the drain hole 770A or when the hose is disconnected from the drain hole 770A. Such fluid 60 may be removed from the interior volume of the utility conduit 780 via the drain outlet 790.

In some embodiments, such as that illustrated in FIGS. 22 through 25, the riser assembly 510 may also be configured to allow passive drainage of fluid or debris from within the cavity 590 in the cover 570 through the drain outlet 790. For example, the top 540B of the container 540 may define therein a drain upper inlet 790B, configured to allow fluid or debris that might otherwise accumulate on the upper surface 5401 of the top 540B of the container 540, within the cavity 590, to exit the cavity 590. The drain upper inlet 790B may access an upper drain conduit 792B that communicates with the drain outlet 790. Accordingly, fluid or debris within the cavity 590 may passively enter the upper drain conduit 792B via the drain upper inlet 790B and pass down into the drain outlet 790 via which it exists the riser assembly 510. Therefore, the drain outlet 790, with the upper drain conduit 792B connected to the lower drain conduit 792A, may prevent unwanted water or debris from accumulating in the cavity 590 and may also accommodate cleaning of the cavity 590.

In some embodiments, the drain upper inlet 790B may be defined in a recessed area of the upper surface 5401 of the top 540B of the container 540 to enable fluid or debris within the cavity 590 to move to the drain upper inlet 790B merely due to gravity.

The drain outlet 790, the lower drain conduit 792A, and the upper drain conduit 792B may be formed of the same material from which the utility conduit 780 and the container 540 are formed, e.g., HDPE. Accordingly, the drain outlet 790, the lower drain conduit 792A, and the upper drain conduit 792B may be bonded, fused, or otherwise seamlessly joined to one another and to the utility conduit 780, thereby minimizing the risk of unwanted leakage of fluid 60 from the reservoir 550.

Accordingly, disclosed is a riser assembly, wherein a utility conduit supports at least one connection pipe communicating through the utility conduit to the reservoir, the connection pipe configured to be selectively openable to allow passage of an amount of a pressurized fluid to pass from the reservoir into the utility conduit.

Figure 26:
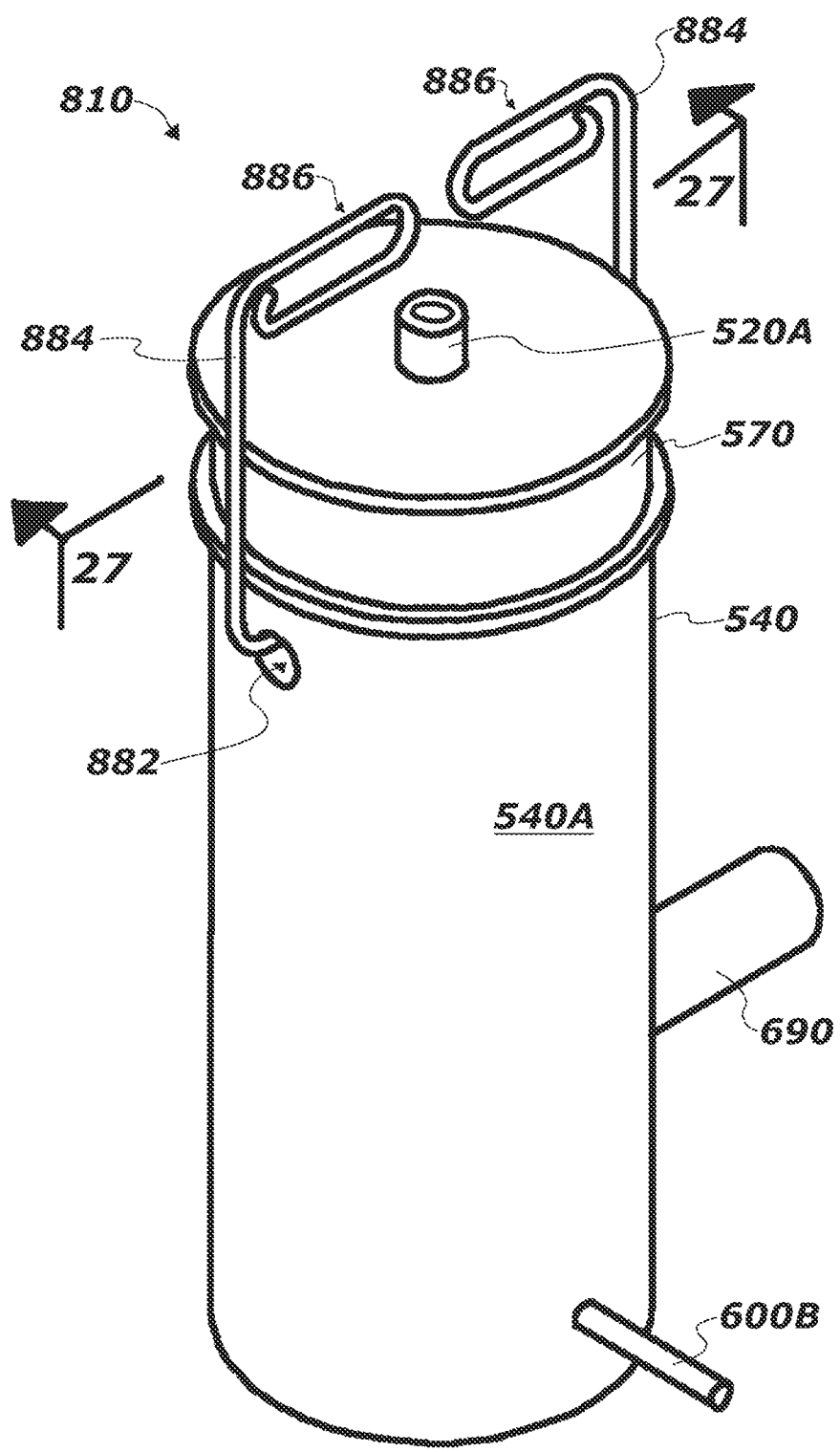
FIG. 26 is a top, rear, and right side, perspective schematic illustration of a riser assembly according to another embodiment of the present disclosure, wherein the riser assembly includes a utility conduit configured for use in transporting and securing the riser assembly, illustrated in a configuration for transporting the riser assembly.
Figure 27:
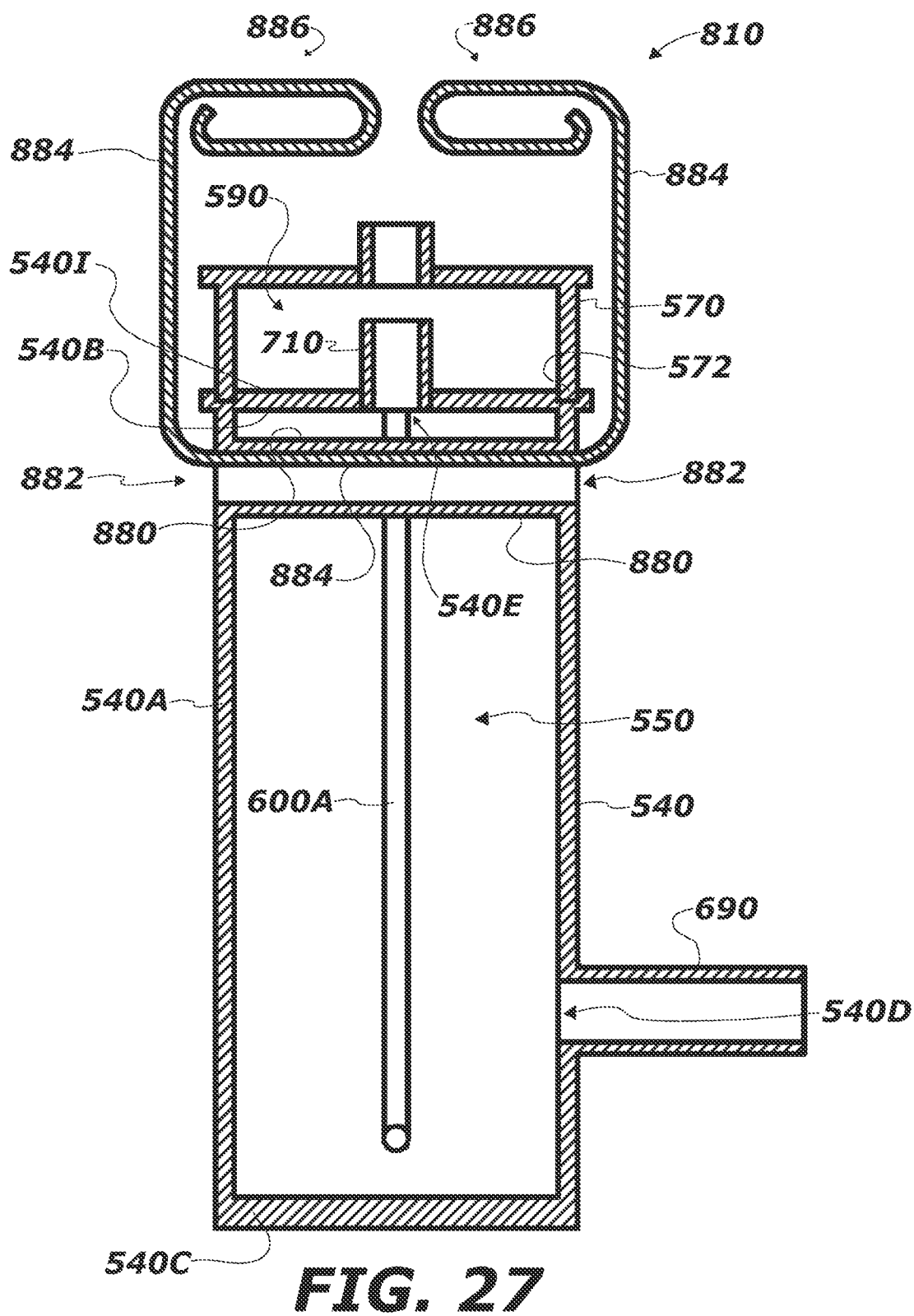
FIG. 27 is a cross-sectional, right side, elevational schematic illustration taken along line 27-27 of FIG. 26.

With reference to FIGS. 26 through 29, illustrated is an embodiment of a riser assembly 810 having a utility conduit 880 configured to accommodate transportation of the riser assembly 810 and securing of the riser assembly 810 for use. The utility conduit 880, which may be formed of the same material as the container 540, communicates through more than one area of the container 540. For example, as illustrated in FIGS. 26 and 27, the utility conduit 880 communicates through two oppositely disposed areas of the sidewall 540A of the container 540, each end of the utility conduit 880 exposed via openings 882 defined in an exterior surface of the sidewall 540A.

A bracing element 884 may be selectively passed into and extend through the utility conduit 880 and may extend from both openings 882. The bracing element 884 may include, for example and without limitation, one or more of a chain, a cord, a rope, and other such flexible, elongate structure capable of extending at least partially through the utility conduit 880 and capable of being engaged by a transporter, installer, or like individual or machine.

The bracing element 884 may include one or more handles 886 to accommodate handling of the bracing element 884. For example, two handles 886 may be included, one at each end of the bracing element 884.

To transport the riser assembly 810, e.g., to a location where the riser assembly 810 is to be installed, the bracing element 884 may be passed through the utility conduit 880 and arranged so that one handle 886 extends from one of the openings 882 while the other handle 886 extends from the other of the openings 882. An installer or transporter may grasp or otherwise engage each of the handles 886 and thereby lift and move the riser assembly 810. After transporting or installing the riser assembly 810, the bracing element 884 (e.g., rope or cord) may be removed from the utility conduit 880 by passing one of the handles 886 through its nearest opening 882, along a length of the utility conduit 880, and out the other opening 882. It is contemplated that such transport or installation may be accomplished while the reservoir 550 is devoid of fluid 60, in which circumstance the riser assembly 810 may be lighter in weight than when filled with fluid 60.

While it is contemplated that the bracing element 884 may be a flexible elongate structure that may be selectively inserted and removed from the utility conduit 880, in other embodiments, the bracing element 884 may be at least partially rigid and configured to not be removable from the utility conduit 880.

Figure 28:
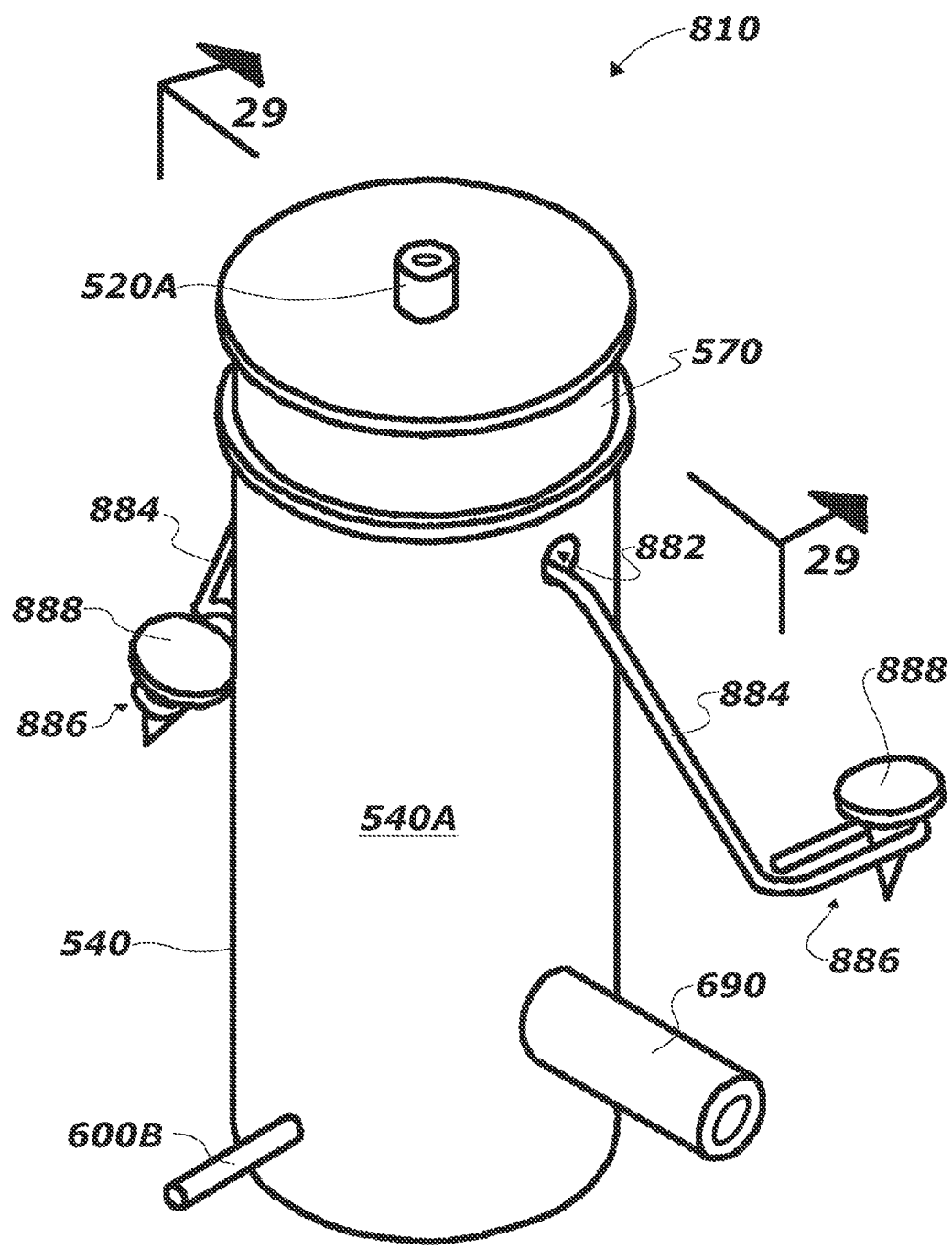
FIG. 28 is a top, front, and right side, perspective schematic illustration of the riser assembly of FIGS. 26 and 27, illustrated in a configuration for securing the riser assembly.
Figure 29:
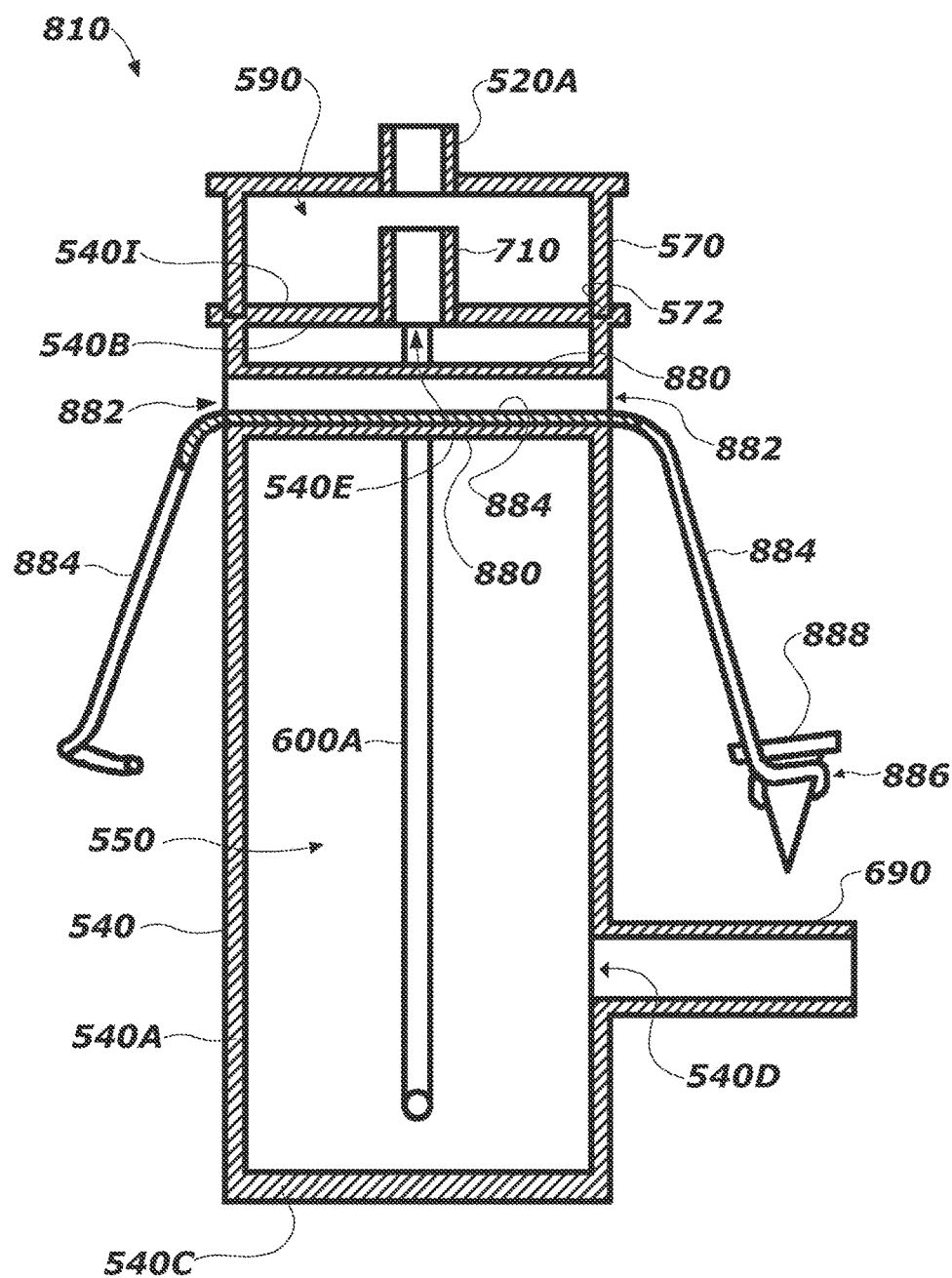
FIG. 29 is a right side, elevational schematic illustration taken along line 29-29 of FIG. 28.

With reference to FIGS. 28 and 29, in some embodiments, the bracing element 884 may also be configured to enable bracing or other securing of the riser assembly 810, e.g., during operation of the riser assembly 810. For example, the bracing element 884 may be moved from the configuration illustrated in FIGS. 26 and 27, wherein the handles 886 of the bracing element 884 are directed upward, to a configuration, illustrated in FIGS. 28 and 29, wherein the handles 886 of the bracing element 884 are directed downward. Thereafter, the handles 886 may be utilized to receive therein a fastener 888, e.g., a stake, so as to secure the bracing element 884 into, for example, the ground or other structure in which the riser assembly 810 is being installed. Therefore, in such embodiments, the bracing element 884 may be configured to have a length (defined as the maximum lateral distance of extension between the handles 866), approximately equal to the length of the utility conduit 880 and the linear distance between each of the openings 882 and a point at which each of the fasteners 888 are to be received. Notably, as illustrated in FIG. 29, the handles 886 of the bracing element 884 may extend to an elevation that is raised relative to the fluid intake pipe 690 and the first conduit portion 600B (FIGS. 17 through 20), each of which may be disposed below ground level when the riser assembly 810 is installed. Therefore, only about half of the height of the riser assembly 810 may extend above a ground level when the riser assembly 810 is installed. However, in other embodiments, the riser assembly 810 may be installed to extend a majority or essentially all of its height above a ground or other structure in or on which the riser assembly 810 is installed. In such embodiments, the bracing element 884 may be of a longer length than that illustrated in FIGS. 28 and 29.

As illustrated in FIGS. 27 and 29, the utility conduit 880 may communicate only with areas exterior to the container 540 such that a volume within the utility conduit 880 is wholly isolated from the reservoir 550 in the container 540. In other embodiments (not shown), the utility conduit 880, configured to enable transport and securing of the riser assembly 810, may be combined or may be in addition to the utility conduit 780 (FIGS. 17, 18, and 22 through 25) discussed above. For example, the utility conduit 880 may also include a connection pipe 720C communicating with the reservoir 550, or the riser assembly 810 may include the utility conduit 880 for transport and bracing and a separate utility conduit to enable secondary use of fluid 60 within the reservoir, such as the utility conduit 780.

The areas of the container 540 through which the utility conduit 880 communicates may be disposed in an upper portion of the container 540, proximate to the top 540B of the container 540, as illustrated in FIG. 27, which areas may be elevated relative to a center of gravity of the riser assembly 810 when essentially devoid of fluid 60. Accordingly, the riser assembly 810 may be transported with a majority of the weight of the riser assembly 810 disposed below the points at which the bracing element 884 engages the upper areas of the utility conduit 880. This configuration may accommodate transportation of the riser assembly 810 without excessive tipping of the riser assembly 810. It may further accommodate installation and removal of the riser assembly 810 in that the utility conduit 880 may be configured to be elevated to a ground surface or other upper structure surface in which the riser assembly 810 is to be installed.

Accordingly, described is a riser assembly with a utility conduit that communicates through at least two oppositely disposed areas of the container. A bracing element may pass through the utility conduit and extend from the at least two oppositely disposed areas of the container. The bracing element may be selectively removable from the utility conduit, and the bracing element may include at least one handle portion configured to receive therein a fastener.

Figure 30:
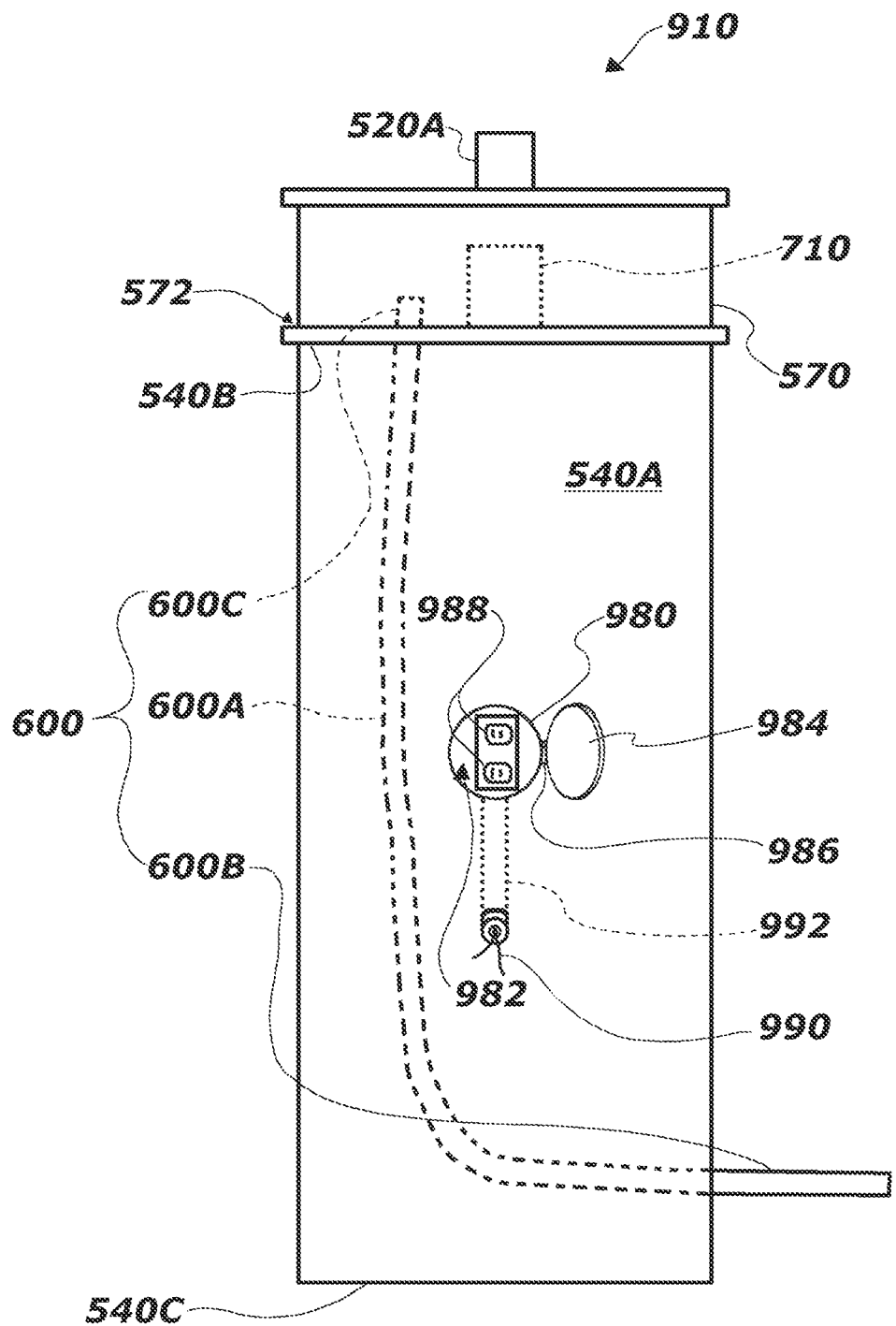
FIG. 30 is a rear side, elevational schematic illustration of a riser assembly according to another embodiment of the present disclosure, wherein the riser assembly includes a utility conduit configured to accommodate secondary usage of power in operational connection with the riser assembly.
Figure 31:
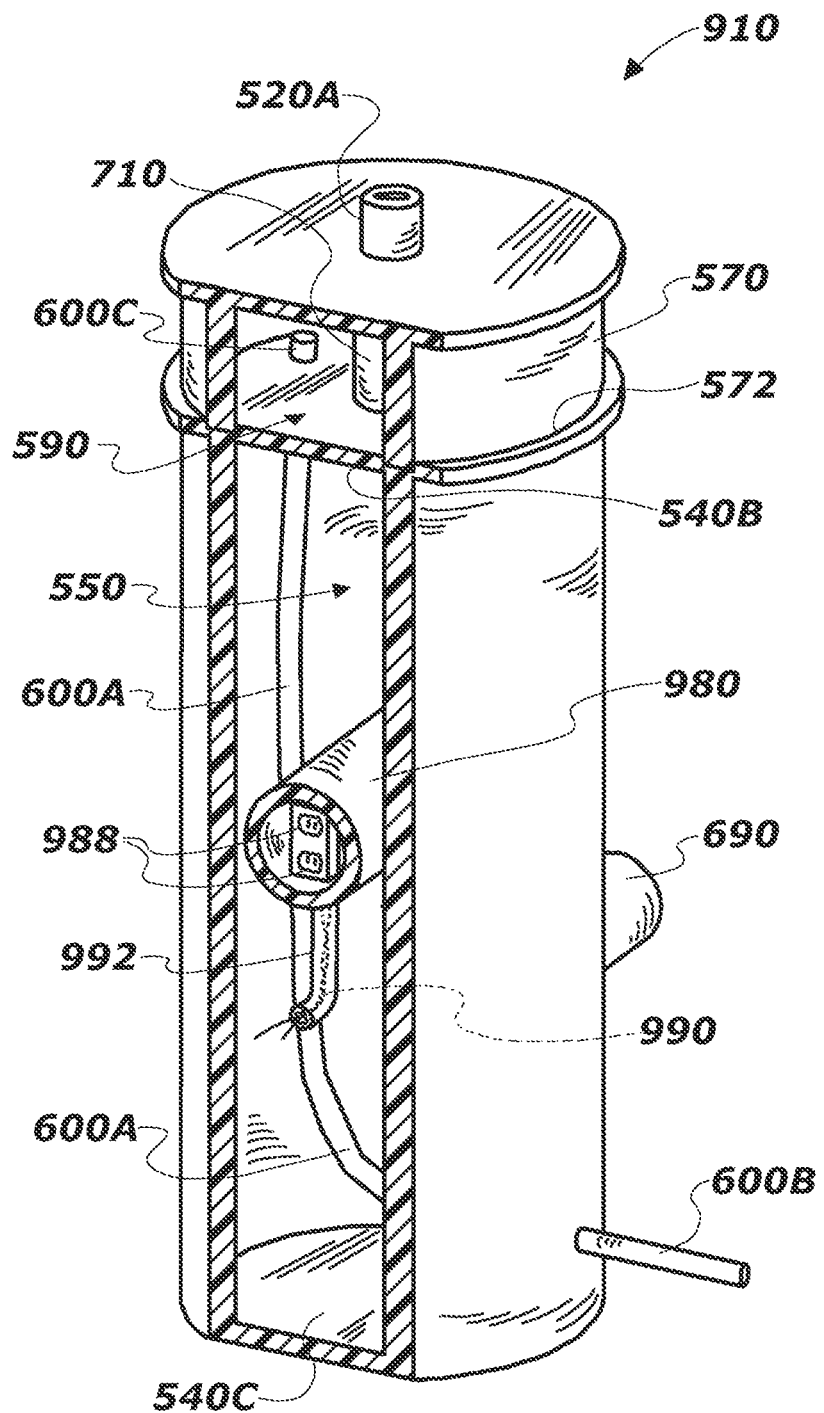
FIG. 31 is a cross-sectional, top, rear, and right side, perspective schematic illustration of the riser assembly of FIG. 30.

With reference to FIGS. 30 and 31, illustrated is an embodiment of a riser assembly 910 having a utility conduit 980 configured to accommodate secondary usage of an energy or power resource, which energy or power resource may be primarily utilizable within the riser assembly 910. The utility conduit 980, which may be formed of the same material as the container 540, may communicate through at least one area of the container 540 and may be disposed at least partially within the reservoir 550 of the riser assembly 910. The utility conduit 980, which may be configured as a cylinder extending partially or wholly across a width (e.g., diameter) of the container 540, may be exposed by an opening 982, which may be opposite a closed end. The opening 982, which may be defined in the sidewall 540A of the container 540 (FIGS. 17 through 21) may be selectively coverable by a door 984, which may be pivotably connected to the container 540 via a hinge 986. The door 984 may include a lock to secure the door 984 to the sidewall 540A of the container 540 in a closed configuration. Accordingly, a volume within the utility conduit 980 may be selectively closed off and selectively accessed.

The utility conduit 980 may contain therein one or more power-utilizing devices 988, such as one or more power outlets each configured to receive and feed power to a conventional power plug. The power-utilizing device 988 may be recessed within the utility conduit 980, and, therefore, disposed within a periphery of the container 540. The power-utilizing device 988 may be isolated from external conditions by use of the door 984.

The power-utilizing device 988 may be operationally connected to an energy source configured to provide power to other primary power-utilizing devices within the riser assembly 910, such as the solenoid 30A (FIG. 9), the control valve 30 (FIG. 9), and the signal carrier 120 (FIG. 6).

Additionally or alternatively, as illustrated in FIGS. 30 and 31, the power-utilizing device 988 may operationally connect to an energy source disposed external to the container 540, power from which may be fed to the power-utilizing device 988 by a power carrier 990 passing into the utility conduit 980 via an electrical conduit 992. When the riser assembly 910 is installed, the electrical conduit 992 may be buried under the upper surface of the ground or other structure in which the riser assembly 910 is installed. As illustrated in FIGS. 30 and 31, the power carrier 990 may be isolated from the reservoir 550 and the fluid 60 therein by the electrical conduit 992, which may communicate, within the riser assembly 910, only with the utility conduit 980 and components disposed therein.

The electrical conduit 992 may be formed of the same material from which the container 540 and the utility conduit 980 are formed, e.g., HDPE. Therefore, the electrical conduit 992 may be fused, bonded, or otherwise seamlessly joined with the utility conduit 980 and the sidewall 540A of the container 540.

Accordingly, disclosed is a riser assembly comprising a utility conduit at least partially traversing a width of a reservoir at least partially circumscribed by a container wall. A power-utilizing device is at least partially disposed within the utility conduit and is isolated from the reservoir. An electrical conduit traverses at least a portion of the reservoir and communicates between the utility conduit and a region exterior to the container.

Figure 32:
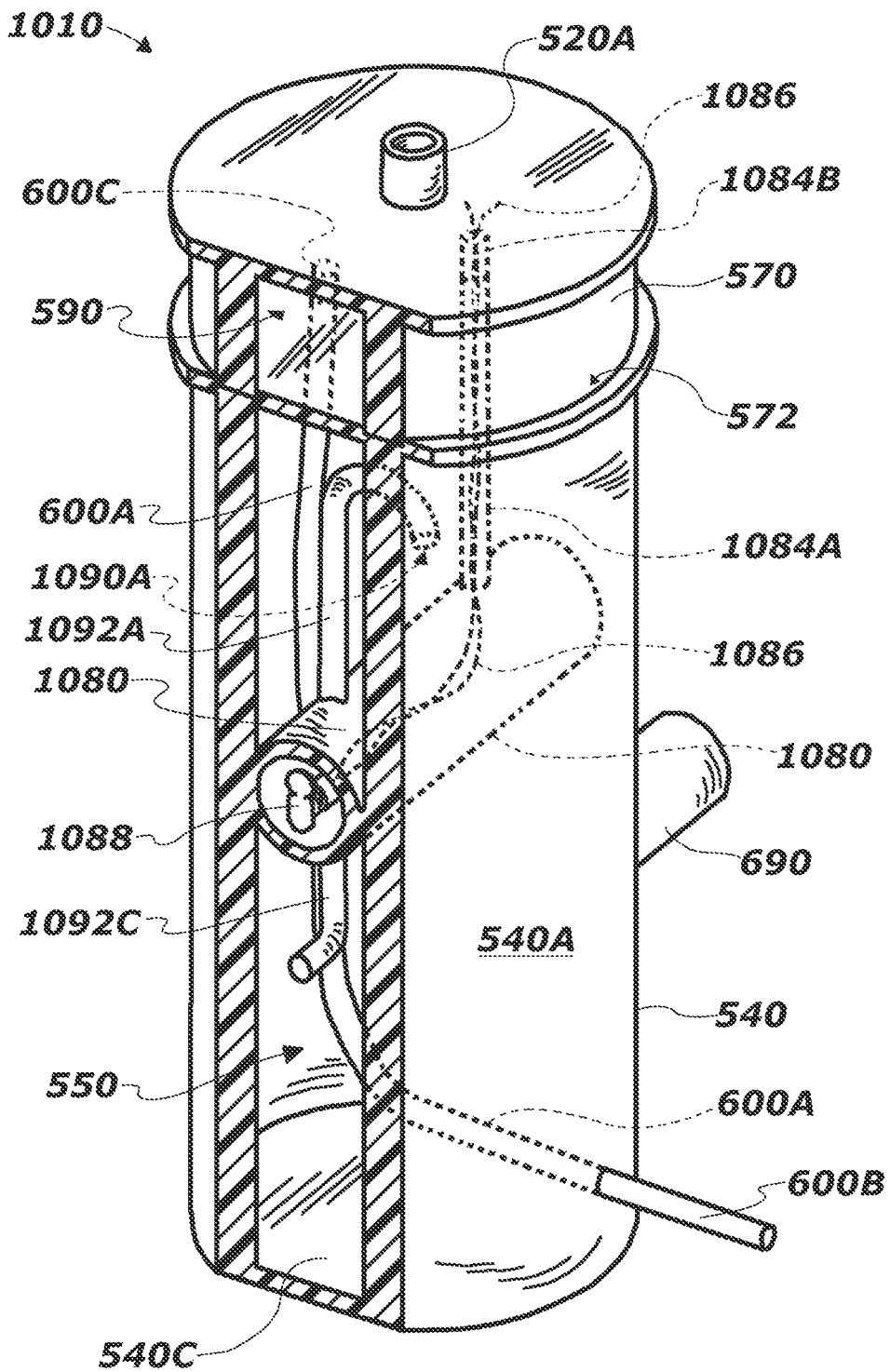
FIG. 32 is a cross-sectional, top, rear, and right side, perspective schematic illustration of a riser assembly according to another embodiment of the present disclosure, wherein the riser assembly includes a utility conduit configured to accommodate secondary usage of both power in operational connection with the riser assembly and fluid from within the reservoir of the riser assembly.
Figure 33:
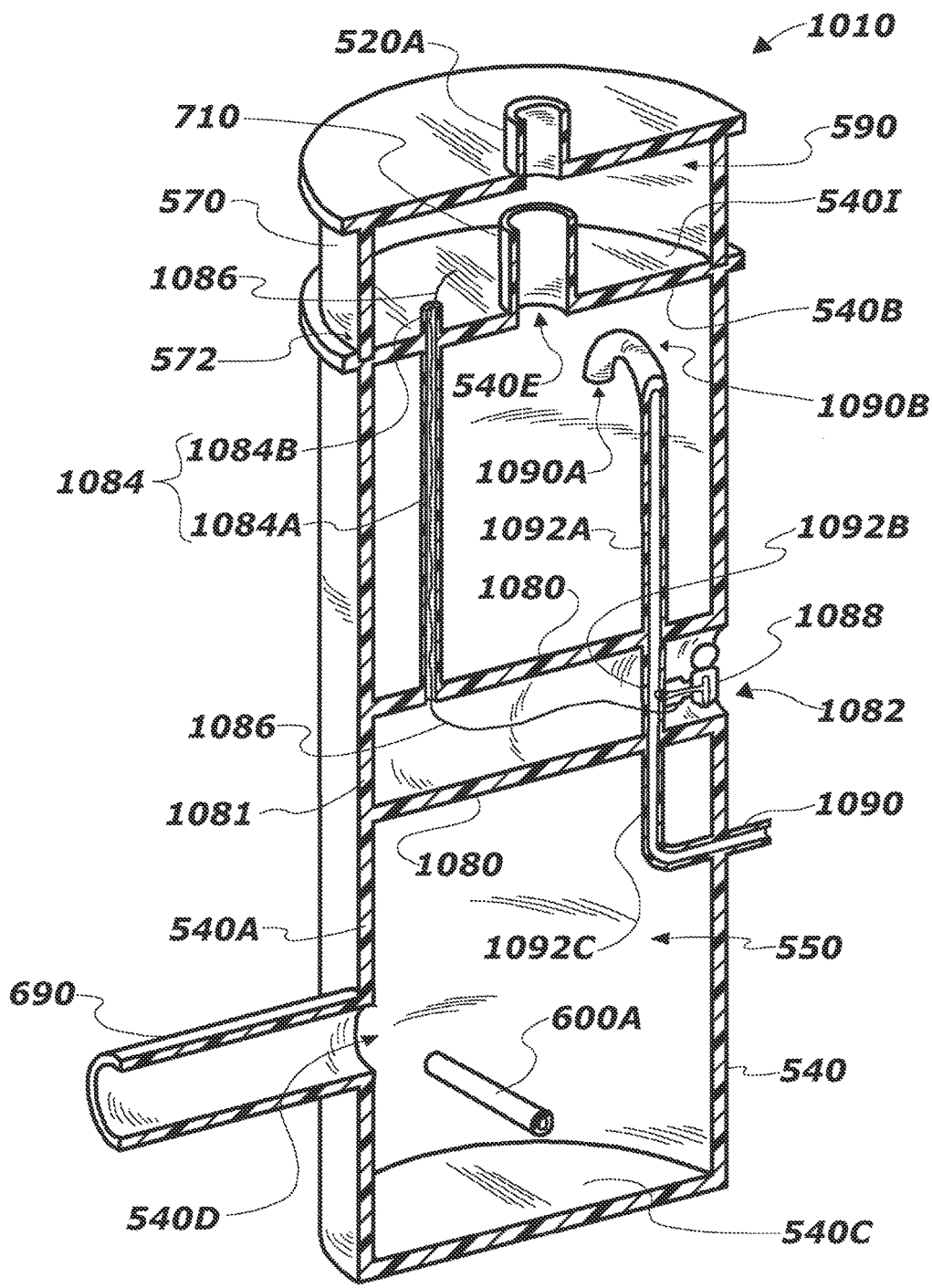
FIG. 33 is a cross-sectional, top, front, and left side, perspective schematic illustration of the riser assembly of FIG. 31.

With reference to FIGS. 32 and 33, illustrated is an embodiment of a riser assembly 1010 having a utility conduit 1080 configured to enable secondary usage of fluid 60 (FIG. 9) from within the reservoir 550 in operative connection with a secondary usage of an energy or power resource that may be otherwise utilizable by the riser assembly 1010.

The utility conduit 1080 may be configured as a cylinder traversing a width (e.g., diameter) of the container 540 and may include a closed end 1081 and an opening 1082 at an opposite end that communicates through the sidewall 540A of the container 540. The riser assembly 1010 includes a power-utilizing device 1088 configured as a powered fluid-dispensing valve. The power-utilizing device 1088 may be supplied with energy from a power source also utilized by devices disposed within the cavity 590 within the cover 570, e.g., the solenoid 30A (FIG. 9), the control valve 30 (FIG. 9), and the signal carrier 120 (FIG. 6). Energy may be carried down from the cavity 590 via an electrical conduit 1084 that includes a lower electrical conduit portion 1084A and, optionally, an upper electrical conduit portion 1084B. The lower electrical conduit portion 1084A may communicate through the utility conduit 1080 and the top 540B of the container 540. The upper electrical conduit portion 1084B may extend into the cavity 590 from the upper surface 5401 of the top 540B of the container 540. A power carrier 1086 may extend from the cavity 590 into the electrical conduit 1084 to the utility conduit 1080 where it may be operatively connected to the power-utilizing device 1088. Thus, the power carrier 1086 may traverse a portion of the reservoir 550, which may be filled with fluid 60 (FIG. 9) while being isolated from the reservoir 550. The power carrier 1086 may, within the cavity 590 be operatively connected to one or more power-utilizing devices disposed therein, such as the solenoid 30A (FIG. 9) or the control valve 30 (FIG. 9). Accordingly, power supplied to the riser assembly 1010 to primarily power one or more of the elements of the primary fluid dispensing system (e.g., for expelling fluid 60 through the fluid dispenser 20 (FIG. 9)), may also supply power to a secondary fluid dispensing system (e.g., for expelling fluid 60 through the power-utilizing device 1088 disposed within the utility conduit 1080). Therefore, not only may the fluid 60 be utilized in both a primary and a secondary manner, power utilized by the riser assembly 1010 may be utilized in both a primary and a secondary manner.

The power-utilizing device 1088 may be configured as the secondary fluid outlet subassembly 220 of FIG. 10, with the lever 230B, operatively connected to the ball 230C, configured as a power-operable lever, as opposed to being solely manually operable, to open and close the fluid drain valve 240. Further, in some embodiments, as illustrated in FIG. 33, the secondary fluid outlet subassembly 220 may be configured to release fluid 60 from the reservoir 550 either through the power-utilizing device 1088, e.g., to a selectively attachable hose or through a drain outlet 1090, e.g., to a drain system. Thus, the power-utilizing device 1088 may be controlled to enable secondary use of the fluid 60 through the power-utilizing device 1088 to an area external to the riser assembly 1010 and to enable emptying of fluid 60 from the reservoir 550 without expelling the drained fluid 60 through the fluid dispenser 20 (FIG. 9).

To enable draining of the reservoir 550, through the drain outlet 1090, the drain outlet 1090 may receive fluid 60 that may pass into a drain inlet 1090A, pass through a curved portion 1090B, and then into an upper drain conduit 1092A that feeds to an intermediate drain conduit 1092B traversing through a width (e.g., diameter) of the utility conduit 1080, before passing through a lower drain conduit 1092C that communicates through the sidewall 540A of the container 540 to the drain outlet 1090. Thus, the drain conduit of the riser assembly 1010 includes an upper drain conduit portion (e.g., the upper drain conduit 1092A) extending from the utility conduit 1080 to the curved portion 1090B. The curved portion 1090B extends to the downward-facing drain inlet 1090A. The curved portion 1090B disposed between the drain inlet 1090A and the upper drain conduit 1092A may be configured to prevent dense debris (e.g., rocks, pebbles) from undesirably entering the upper drain conduit 1092A. Accordingly, debris that may have undesirably entered the reservoir 550 may be prevented from passing through, and possibly damaging, the valve of the power-utilizing device 1088.

The riser assembly 1010 may also be configured to operably connect the signal carrier 120 (FIG. 6) to the power-utilizing device 1088. Therefore, a signal passed through the signal carrier 120 may operate, at least in part, to control the power-utilizing device 1088 within the utility conduit 1080. For example, another signal carrier may extend from the cavity 590 down into the electrical conduit 1084 to the utility conduit 1080 where it may be operably connected with the power-utilizing device 1088.

Because the riser assembly 1010 is configured to enable a secondary use of fluid 60 from within the reservoir 550, operating the riser assembly 1010 may include both or either of dispensing the fluid 60 from the primary, fluid dispenser 20 (FIG. 9) and the secondary fluid dispenser (e.g., the power-utilizing device 1088, which includes a power-operated valve). Accordingly, disclosed is a method for operating a riser assembly, the method comprising at least partially filling a reservoir within a container of the riser assembly with fluid and selectively opening a valve disposed within a utility conduit that extends through an area of the container and at least partially into the reservoir. The valve is recessed relative to an exterior surface of the container. The method also includes communicating a signal from a region exterior to the container through a signal carrier within a signal conduit traversing through the reservoir.

Though it is contemplated that the components of the riser assemblies 10, 510, 810, 910, and 1010 may be formed from fusible HDPE, the materials used in construction of the riser assembly may alternatively or additionally include metallic elements, metallic alloys, and other polymers that provide strength, durability, and rust resistance.

The foregoing is considered as illustrative only of the principles of the embodiments of the disclosed riser assembly. Further, since modifications and changes will occur to those skilled in the art, it is not desired to limit the assemblies and methods to the exact constructions and operations shown and described, and, accordingly, all suitable modifications and equivalents may be resorted to, falling within the scope of the following claims.

Thus, while there is shown and described certain embodiments of the assemblies and methods, it is to be distinctly understood that this disclosure is not limited thereto but may be variously embodied to practice within the scope of the following claims. For example, while it is expected that the riser assemblies and methods will be particularly useful for in-ground installations, such as in feedlots, in other embodiments, the riser assemblies and methods may be useful in readily-portable configurations, such as in being mounted to a vehicle having connection to a fluid supply tank or an extendable fluid conduit. Such embodiments would be suitable for use in dowsing wildfires in areas not conducive for the presence of firefighter personnel. Therefore, from the foregoing description, it will be apparent that various changes may be made without departing from the spirit and scope of the invention, as defined by the following claims.

Further, although the foregoing description contains many specifics, these are not to be construed as limiting the scope of the present disclosure, but merely as providing certain embodiments. Similarly, other embodiments of the disclosure may be devised that do not depart from the scope of the present invention. For example, materials, features, and techniques described herein with reference to one embodiment also may be provided in others of the embodiments described herein. The scope of the invention is, therefore, indicated and limited only by the appended claims and their legal equivalents, rather than by the foregoing description. All additions, deletions, and modifications to the disclosure, as disclosed herein, which fall within the meaning and scope of the claims, are encompassed by the present invention.

What is claimed is:

1. A riser assembly comprising:
   a container including a reservoir configured to hold a pressurized fluid;
   a signal conduit traversing through the reservoir, the signal conduit defining therein a channel, the signal conduit isolating the channel from the reservoir; and
   a utility conduit extending horizontally through the reservoir from an opening defined in a sidewall area of the container to an opposing sidewall area of the container, the utility conduit traversing a width of the reservoir.

2. The riser assembly of claim 1, wherein:
   the container comprises a container wall comprising a polymer material, the container wall comprising the sidewall area with the defined opening; and
   the utility conduit comprises the polymer material.

3. The riser assembly of claim 2, wherein the polymer material comprises high-density polyethylene.

4. The riser assembly of claim 1, wherein the signal conduit communicates through a lower area of the container and through an upper area of the container.

5. The riser assembly of claim 1, wherein the opposing sidewall area of the container is a closed end.

6. The riser assembly of claim 1, wherein the utility conduit supports at least one connection pipe communicating through the utility conduit to the reservoir, the connection pipe configured to be selectively openable to allow passage of an amount of the pressurized fluid to pass from the reservoir into the utility conduit.

7. The riser assembly of claim 1, further comprising a drain outlet communicating through the container between the utility conduit and a region exterior to the container.

8. The riser assembly of claim 1, wherein the utility conduit communicates through at least the sidewall area of the container and the opposing sidewall area of the container.

9. The riser assembly of claim 8, further comprising a bracing element passing through the utility conduit and extending from the sidewall area and the opposing sidewall area of the container.

10. The riser assembly of claim 9, wherein the bracing element is selectively removable from the utility conduit.

11. The riser assembly of claim 9, wherein the bracing element comprises at least one handle portion configured to receive therein a fastener.

12. A riser assembly comprising:
- a container wall at least partially circumscribing a reservoir configured to hold a pressurized fluid;
- a utility conduit horizontally traversing through a width of the reservoir and extending between opposing areas of a sidewall of the container;
- a power-utilizing device disposed at least partially within the utility conduit and isolated from the reservoir; and
- an electrical conduit traversing through at least a portion of the reservoir and communicating between the utility conduit and a region exterior to the container.

13. The riser assembly of claim 12, wherein the power-utilizing device comprises a valve in operable communication with a drain conduit extending into the utility conduit from the reservoir.

14. The riser assembly of claim 13, wherein the drain conduit comprises an upper drain conduit portion extending from the utility conduit to a curved portion extending to a downward-facing drain inlet.

15. The riser assembly of claim 14, wherein the drain conduit further comprises:
- an intermediate drain conduit portion disposed within the utility conduit and communicating with the upper drain conduit portion; and
- a lower drain conduit portion extending from the utility conduit and out through the container wall, the lower drain conduit portion communicating with the intermediate drain conduit portion.

16. The riser assembly of claim 12, wherein the power-utilizing device comprises at least one power outlet.

17. A method for operating a riser assembly, the method comprising:
at least partially filling a reservoir within a container of the riser assembly with fluid, the riser assembly comprising:
- the container including the reservoir, the reservoir configured to hold a pressurized fluid;
- a signal conduit traversing through the reservoir, the signal conduit defining therein a channel, the signal conduit isolating the channel from the reservoir; and
- a utility conduit extending horizontally through the reservoir from an opening defined in a sidewall area of the container to an opposing sidewall area of the container, the utility conduit traversing a width of the reservoir; and selectively opening a valve disposed within the utility conduit, the valve recessed relative to an exterior surface of the container.

18. The method of claim 17, further comprising communicating a signal, from a region exterior to the container through a signal carrier within the signal conduit, to open the valve and dispense fluid from the reservoir.

19. The method of claim 17, wherein at least partially filling a reservoir within a container of the riser assembly with the fluid comprises at least partially filling the reservoir within the container of the riser assembly with the pressurized water.

20. The method of claim 17, further comprising opening another valve disposed in a cavity within a cover over the container.

* * * * *

UNITED STATES PATENT AND TRADEMARK OFFICE
CERTIFICATE OF CORRECTION

PATENT NO. : 9,849,476 B1  
APPLICATION NO. : 14/145836  
DATED : December 26, 2017  
INVENTOR(S) : Wade E. Collins It is certified that error appears in the above-identified patent and that said Letters Patent is hereby corrected as shown below:

In the Specification

| | | |
|---|---|---|
| Column 12, | Line 5, | change "gasket 2551 and" to --gasket 255I and-- |
| Column 15, | Line 37, | change "surface 5401 (FIG." to --surface 540I (FIG.-- |
| Column 15, | Line 45, | change "surface 5401 of" to --surface 540I of-- |
| Column 19, | Line 2, | change "5401 of the top" to --540I of the top-- |
| Column 19, | Line 15, | change "surface 5401 of" to --surface 540I of-- |
| Column 22, | Line 39, | change "upper surface 5401" to --upper surface 540I-- |

Signed and Sealed this  
Twenty-fourth Day of April, 2018

Andrei Iancu  
*Director of the United States Patent and Trademark Office*